United States Patent
Ramalingam et al.

(10) Patent No.: US 9,912,517 B1
(45) Date of Patent: Mar. 6, 2018

(54) OPTIMIZED DEPLOYMENT AND EXECUTION OF PROGRAMS IN A DISTRIBUTED COMPUTING ENVIRONMENT

(75) Inventors: Harsha Ramalingam, Kirkland, WA (US); Bhavnish H. Lathia, Redmond, WA (US); Kyle Bradley Peterson, Seattle, WA (US); Leon Robert Warman, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 781 days.

(21) Appl. No.: 13/592,922

(22) Filed: Aug. 23, 2012

(51) Int. Cl.
*G06F 15/16* (2006.01)
*H04L 29/08* (2006.01)
*H04L 29/06* (2006.01)

(52) U.S. Cl.
CPC ........ *H04L 29/08072* (2013.01); *H04L 29/06* (2013.01)

(58) Field of Classification Search
CPC ....... G06F 9/541; H04L 49/501; H04L 29/06; H04L 29/08072
USPC .......................... 709/203, 220, 224, 227, 232
See application file for complete search history.

(56) References Cited

U.S. PATENT DOCUMENTS

| | | | | |
|---|---|---|---|---|
| 6,832,238 | B1* | 12/2004 | Sharma | G06F 9/466 707/999.003 |
| 7,234,147 | B1* | 6/2007 | Gharavy et al. | 719/318 |
| 8,060,908 | B2* | 11/2011 | Bountour | H04N 7/181 725/141 |
| 8,250,586 | B2 | 8/2012 | Nelson | |
| 8,392,019 | B2* | 3/2013 | Segal | G07F 11/00 221/126 |
| 8,739,177 | B2 | 5/2014 | Qian et al. | |
| 9,588,788 | B1* | 3/2017 | Ramalingam | G06F 9/45558 |
| 2004/0192277 | A1* | 9/2004 | Pakarinen | G06F 9/541 455/418 |

(Continued)

OTHER PUBLICATIONS

Office Action for U.S. Appl. No. 13/791,193, dated Feb. 27, 2015, Harsha Ramalingam, "Optimized Communication Between Program Components Executing in Virtual Machines", 14 pages.

(Continued)

*Primary Examiner* — Khanh Dinh
(74) *Attorney, Agent, or Firm* — Lee & Hayes, PLLC

(57) ABSTRACT

The execution of a distributed program including one or more program components may be optimized in an automated manner. A runtime optimization policy and/or a meta-description of the distributed program may be received. The runtime optimization policy may define metrics, constraints and/or preferences for use in optimizing the deployment and execution of the components of the distributed program. The meta-description may include data defining one or more consumable interfaces exposed by the program components and one or more dependency adapters utilized by the program components of the distributed program. The runtime optimization policy and/or the meta-description may be utilized to optimize the distributed program at build time, runtime and/or execution time of the components of the distributed program. Dynamic optimization might also be performed during runtime of the distributed program. An optimization component might optimize the deployment and execution of the distributed program in an automated fashion.

24 Claims, 22 Drawing Sheets

(56) References Cited

U.S. PATENT DOCUMENTS

| | | | |
|---|---|---|---|
| 2005/0102308 A1* | 5/2005 | Sykes et al. | 707/102 |
| 2005/0114855 A1 | 5/2005 | Baumberger | |
| 2005/0240819 A1 | 10/2005 | Bennett et al. | |
| 2007/0140263 A1 | 6/2007 | Mitome et al. | |
| 2007/0300218 A1 | 12/2007 | Mann | |
| 2008/0086729 A1 | 4/2008 | Kondoh et al. | |
| 2008/0117909 A1 | 5/2008 | Johnson | |
| 2009/0138312 A1* | 5/2009 | Moll et al. | 705/8 |
| 2011/0055829 A1 | 3/2011 | Dake | |
| 2011/0191759 A1* | 8/2011 | Andrade et al. | 717/151 |
| 2012/0110275 A1 | 5/2012 | Ganti et al. | |
| 2012/0159517 A1* | 6/2012 | Shen et al. | 719/318 |
| 2012/0203877 A1 | 8/2012 | Bartholomay et al. | |
| 2012/0254507 A1 | 10/2012 | Chang et al. | |
| 2012/0284712 A1 | 11/2012 | Nimmagadda et al. | |
| 2013/0346470 A1 | 12/2013 | Obstfeld et al. | |

OTHER PUBLICATIONS

Final Office Action for U.S. Appl. No. 13/791,193, dated May 22, 2015, Harsha Ramalingam, "Optimized Communication Between Program Components Executing in Virtual Machines", 16 pages.

Office action for U.S. Appl. No. 13/791,193, dated Feb. 24, 2016, Ramalingam et al., "Optimized Communication Between Program Components Executing in Virtual Machines", 19 pages.

Office Action for U.S. Appl. No. 13/791,193, dated Sep. 21, 2015, Ramalingam et al., "Optimized Communication Between Program Components Executing in Virtual Machines", 15 pages.

Office action for U.S. Appl. No. 13/791,193, dated Jul. 11, 2016, Ramalingam et al., "Optimized Communication Between Program Components Executing in Virtual Machines", 18 pages.

\* cited by examiner

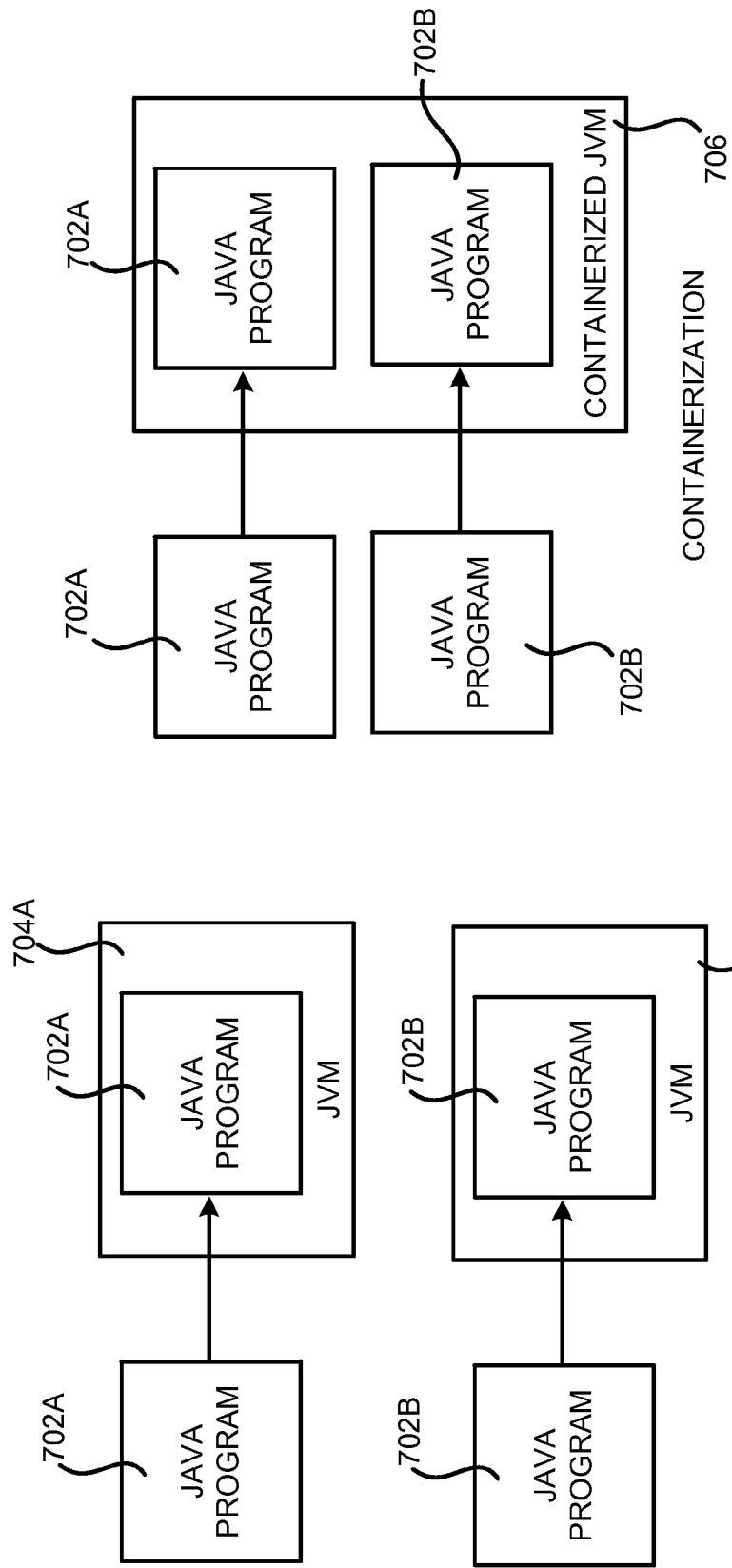

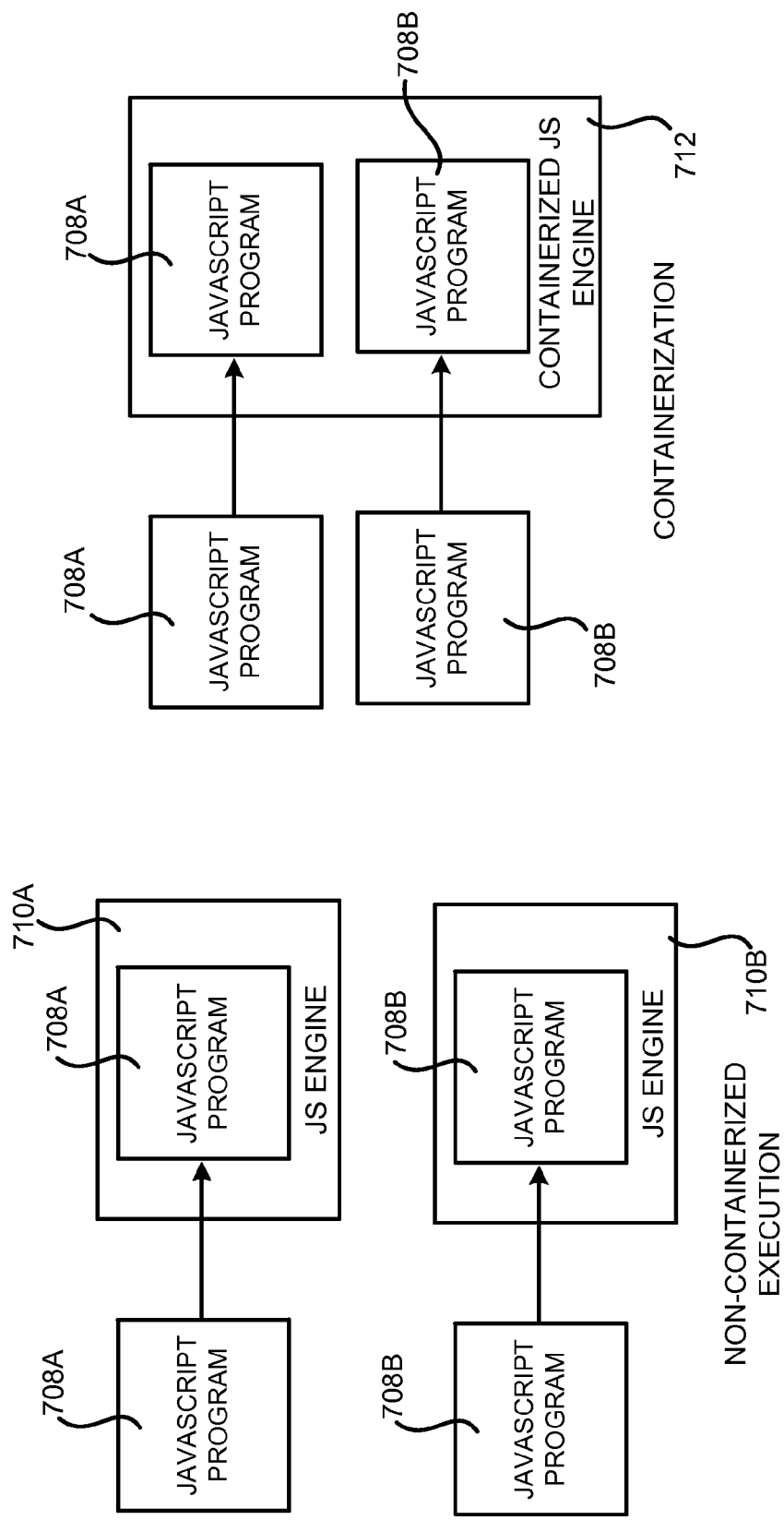

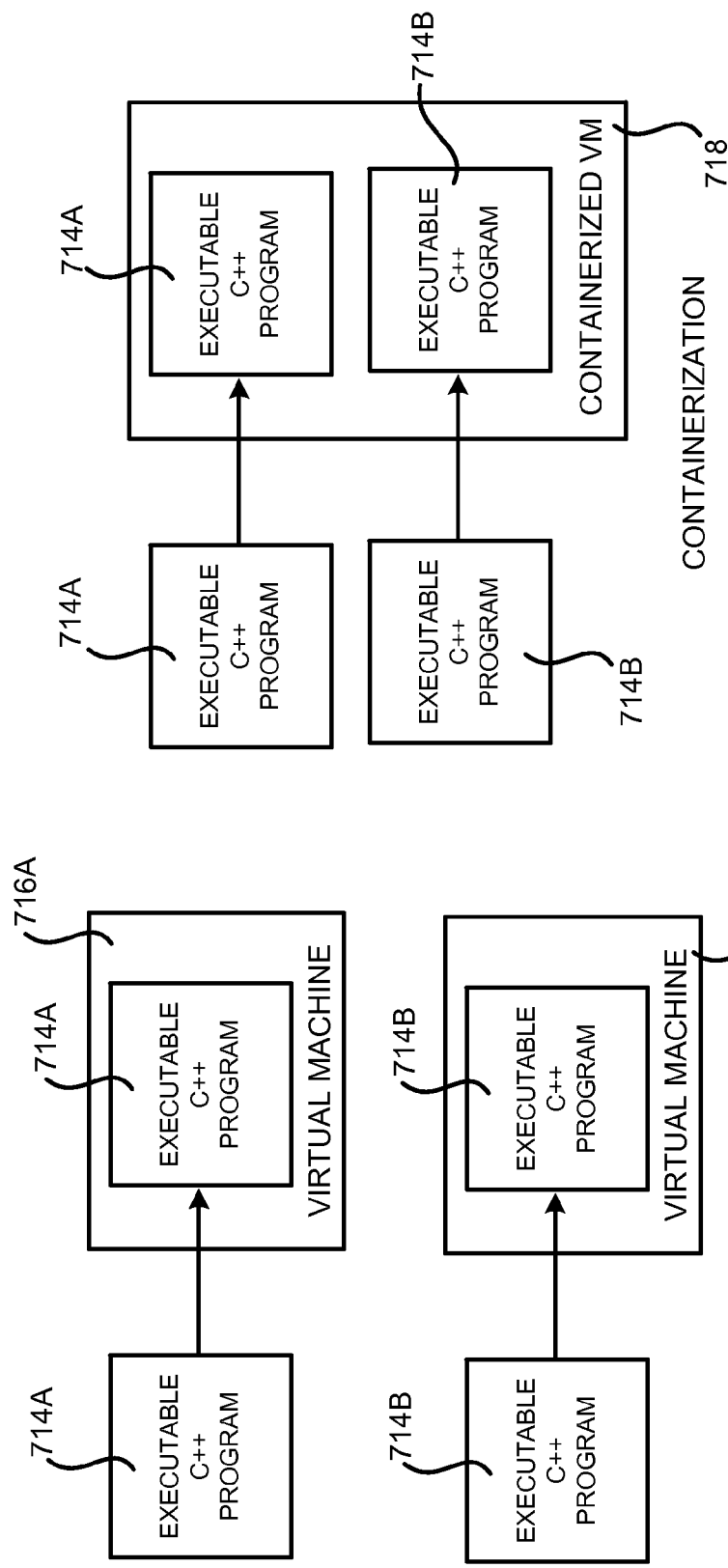

UNOPTIMIZED EXECUTION

OPTIMIZED EXECUTION

UNOPTIMIZED EXECUTION

OPTIMIZED EXECUTION

OPTIMIZED DEPLOYMENT AND EXECUTION OF PROGRAMS IN A DISTRIBUTED COMPUTING ENVIRONMENT

BACKGROUND

Distributed computing environments can provide computing resources configured according to a service-oriented architecture ("SOA") for executing distributed computer programs on a permanent or an as-needed basis. The computing resources provided by such distributed computing environments may include various types of resources, such as data processing resources, data storage resources and others. Each type of computing resource may be general-purpose or may be available in a number of specific configurations. For example, data processing resources may be available as configurable virtual machine instances for executing various program components of a distributed program.

Distributed computing environments, such as those described above, have evolved over time to provide a significant number of services and other facilities for executing distributed programs. Along with this increased functionality, however, it has also become increasingly more difficult for developers to create, deploy and execute distributed programs in distributed computing environments in a robust, efficient and scalable manner.

It is with respect to these and other considerations that the disclosure made herein is presented.

BRIEF DESCRIPTION OF THE DRAWINGS

FIGS. 7A-7G are software architecture diagrams illustrating the containerization of various types of program components, according to embodiments disclosed herein;

DETAILED DESCRIPTION

Figure 1:
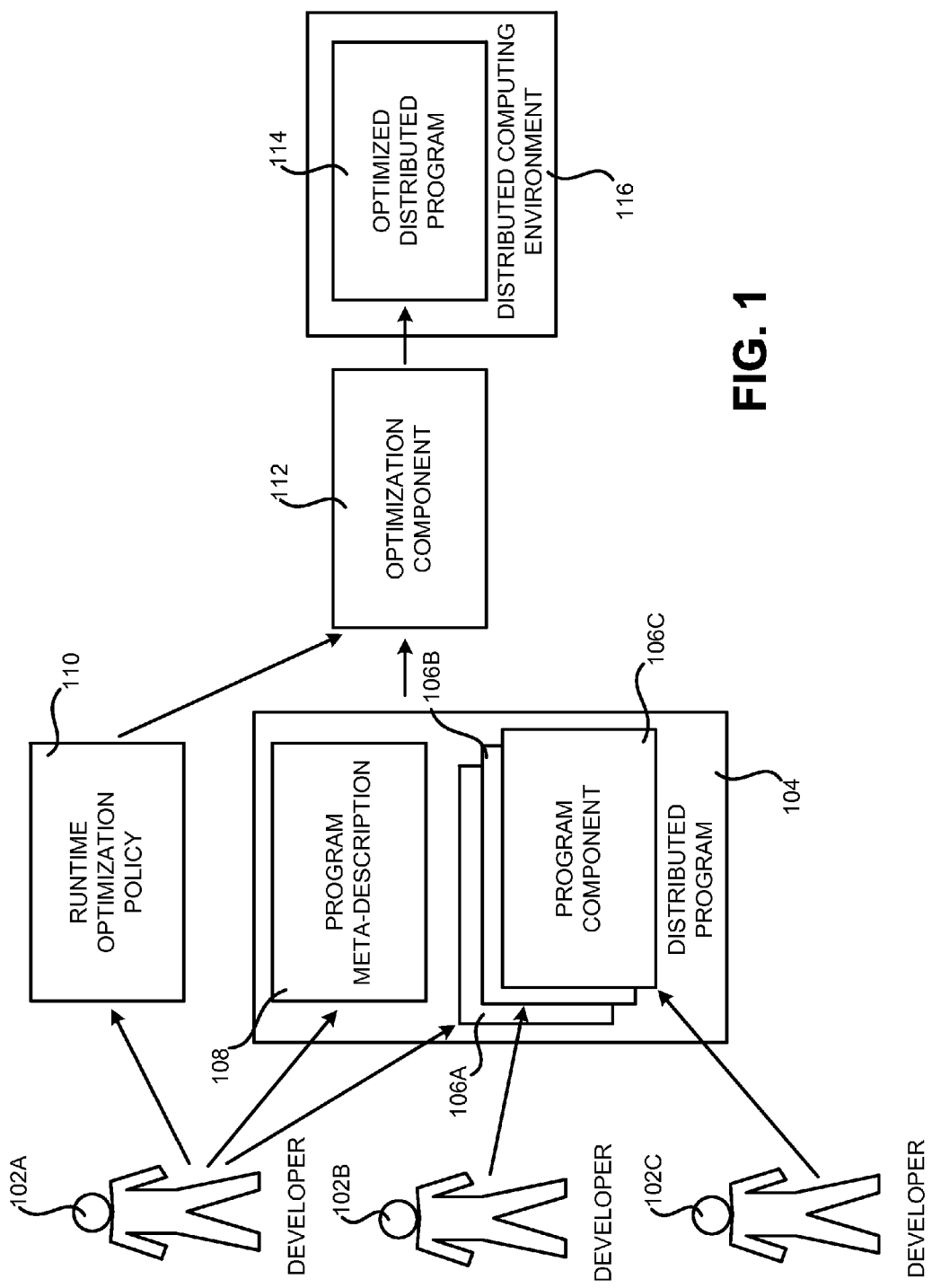
FIG. 1 is a software architecture diagram showing aspects of one mechanism disclosed herein for optimized deployment and execution of programs in a distributed computing environment.

The following detailed description is directed to technologies for automated optimized deployment and execution of programs in a distributed computing environment. Utilizing the technologies described herein, a developer can more easily create, deploy and execute a distributed program in a distributed computing environment in a reliable, scalable, performant and cost-efficient manner.

In order to provide the functionality briefly described above, components are provided for execution within or in conjunction with a distributed computing environment that can configure, deploy and execute the program components of a distributed program in an optimized way with minimal input from a developer of the distributed program. As utilized herein, the term "optimize" means to optimize at least one aspect of the operation of at least one component utilized by a distributed program. Following the optimization of the distributed program, the distributed program may operate in some manner more optimally than it did prior to the application of the optimization techniques presented herein. The term "optimize" is not intended to mean that a distributed program is fully optimized. For instance, in embodiments only one or more program components utilized in the operation of a distributed program might be optimized utilizing the concepts presented herein. Other program components utilized by the distributed program might not be optimized.

According to one embodiment, a software developer creates program logic that performs the substantive computations for one or more program components of a distributed program. The developer of the distributed program need not, however, specify all of the runtime environment operating characteristics for the components of the distributed program. Rather, the various mechanisms disclosed herein can determine optimized execution mechanisms for the distributed program, identify optimal locations in a distributed environment for execution of the components of the program, deploy the components of the distributed program to the identified locations, bind the components of the program to frameworks for optimized inter-program communication, and execute the programs in an efficient, low-latency, scalable and distributed manner. Other types of optimizations might also be identified and implemented.

Because the substantive logic of the distributed program may be abstracted from the actual implementation of the logic within the distributed computing environment in which it will execute, the developer of the distributed program may be relieved of the burden of determining an optimized way to configure, deploy, and execute the logic in the distributed execution environment. For example, the optimization components described herein might configure several program components for execution on different physical machines because the program components do not scale well when executed on the same physical machine. As another example, the optimization components described herein might place different components of a distributed program on the same physical or virtual machine because the components exchange a significant volume of data. In this way, the developer may be relieved of having to determine an optimal configuration for execution of the components of a distributed program.

The optimization components described herein might also perform other types of optimizations based upon the characteristics of the distributed program, with little or no involvement of the developer of the distributed program. These mechanisms may make it easier for a developer to create an efficient, scalable distributed program, even in a highly complex distributed computing environment. Additional details regarding the various components and processes described above for optimized configuration, deployment and execution of programs in a distributed computing environment will be presented below with regard to FIGS. 1-18.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram showing aspects of one mechanism disclosed herein for optimized deployment and execution of programs in a distributed computing environment. As shown in FIG. 1, a distributed program 104 includes a number of program components 106A-106C, which might be referred to individually as "a program component 106" or collectively as "the program components 106". The program components 106 are executable programs that together make up the distributed program 104.

The program components 106 that make up the distributed program 104 may be implemented in many different ways, using many different computer languages and technologies. For instance, the program components 106 might be implemented using the JAVA programming language from ORACLE CORP. (referred to herein as "JAVA"), the JAVASCRIPT scripting language also from ORACLE CORP. (referred to herein as "JAVASCRIPT"), the C++ programming language, the PERL programming language, and other compiled and interpreted languages. The program components 106 might also be execution environments capable of executing other programs, such as virtual machine instances, containerized environments for executing JAVA or JAVASCRIPT programs and other types of execution environments. The program components 106 might also call one another utilizing different frameworks and standards.

The program components 106 may be, but are not necessarily tied to the frameworks of the distributed computing environment 116 in which they are executed. Nonetheless, and as will be described in greater detail below, the execution of the distributed program 104 that utilizes the various program components 106 can be optimized utilizing the concepts and technologies disclosed herein.

As also illustrated in FIG. 1, many different, independent developers 102A-102C (which might be referred to individually as "a developer 102" or collectively as "the developers 102") might author and provide the program components 106 of a distributed program 104. For instance, in the example shown in FIG. 1, a developer 102A has provided the program component 106A, a developer 102B has provided the program component 106B, and a developer 102C has provided the program component 106C. The distributed program 104 might be configured to make use of each of the program components 106, even though different, independent developers using different technologies have authored the program components 106.

The term "developer" as used herein should be read to encompass any entity that contributes a portion of a distributed program 104, including, but not limited to, an individual, a team, or an entity, such as a company or corporation. The developers 102 might operate independently to create and contribute the various program components 106 that make up a distributed program 104. In this regard, it should be appreciated that the optimization of the distributed program 104 described herein does not impact the independence that each of the developers 102 has to independently author and deploy components 106 using the technologies of their own choosing.

As shown in FIG. 1, a developer 102A of a distributed program 104 might also provide a program meta-description 108 (referred to herein as a "meta-description") of the distributed program 104. The meta-description 108 is a high-level description of the execution of the various program components 106 that make up the distributed program 104. The meta-description 108 might be expressed using a standardized meta-programming language, such as extensible markup language ("XML") syntax for representing graphs. Other languages and mechanisms might also be utilized to create a meta-description 108 that describes the operation of the program components 106 of a distributed program 104.

In some embodiments, the meta-description 108 is required in order to optimize the deployment and execution of the distributed program 104. In other embodiments, however, the meta-description 108 is optional. The deployment and execution of the distributed program 104 may be optimized based upon an execution graph of the distributed program 104 even without a developer-provided meta-description 108. However, provision of the meta-description 108 may allow additional and/or deeper optimization of the distributed program 104 to be performed.

A graphical user interface ("GUI") might also be provided through which a developer 102 can define the meta-description 108 for the distributed program 104. In other implementations, a Web application programming interface ("API") is provided through which a developer 102 can submit the meta-description 108 for a distributed program 104. Other mechanisms might also be provided for defining and submitting the program meta-description 108.

As will be described in greater detail below with regard to FIGS. 5 and 6, the meta-description 108 might describe the program components 106 that make up the distributed program 104 and how the program components 106 have been defined (e.g. C++, JAVA, JAVASCRIPT, virtual machine image, etc.). The meta-description 108 might also define the other program components 106 that each program component 106 calls, in what order, and how the program calls the other components 106. The meta-description 108 might also describe other components that call each of the program components 106 and how the program components 106 are called.

As illustrated in FIG. 1, the developer 102A of the distributed program 104 might also specify a runtime optimization policy 110 for the distributed program 104. The runtime optimization policy 110 might specify one or more optimization metrics (referred to herein as "metrics") that are consumed by an optimization component 112 when determining how to optimize aspects of the deployment and execution of the distributed program 104.

For instance, through an appropriate interface, the developer 102A can define a runtime optimization policy 110 that specifies the metrics for which the distributed program 104 should be optimized. Metrics for which a distributed program 104 should be optimized for include, but are not limited to, latency, speed of execution, reliability, guaranteed execution, availability, cost, scalability, memory or other resource usage and accuracy.

The runtime optimization policy 110 might also specify one or more constraints that are considered by the optimization component 112 when optimizing the deployment and execution of the distributed program 104. As an example, the runtime optimization policy 110 might specify the maximum number of virtual machine instances or other types of computing resources that can be utilized in the deployment and execution of the distributed program 104. As another example, the runtime optimization policy 110 might specify a limit on the costs that can be incurred in executing the distributed program 104. In this way, the developer 102A can specify that optimization be performed in a manner that optimizes deployment and execution of the program components 106 of the distributed program 104 in view of the metrics and constraints specified in the runtime optimization policy 110.

In some embodiments, the runtime optimization policy 110 also specifies preferences regarding how the deployment and execution of the distributed program 104 should be optimized. For example, the developer 102A might specify data indicating how the developer would prefer the various components 106 of the distributed program 104 to be executed. The preferences might also specify other build time, deployment time and/or runtime preferences that might be utilized to optimize the execution of one or more program components 106 of the distributed program 104. The optimization component 112 might utilize some, all or none of the preferences specified in the runtime optimization policy 110.

It should be appreciated that, in some embodiments, a developer 102A provides the runtime optimization policy 110 prior to the build, deployment and/or runtime of the distributed program 104. In other embodiments, however, the runtime optimization policy 110 might be generated in an automated fashion at build time, deployment time and/or runtime based upon operational characteristics of the distributed program 104. The runtime optimization policy 110 might also be modified during execution of the distributed program 104. For example, instrumentation data might be received regarding various aspects of the execution of the distributed program 104. This data might be utilized to dynamically modify the runtime optimization policy 110 while the distributed program 104 is executing. Other factors might also be utilized to create and/or modify the runtime optimization policy 110 at build time, deployment time and/or execution time of the distributed program 104.

In some embodiments, a developer 102 is required to provide a runtime optimization policy 110. In other embodiments, however, the runtime optimization policy 110 is not required. If a developer 102 does not provide a runtime optimization policy 110, one or more assumptions may be made about the metrics and constraints that should be utilized to optimize the deployment and execution of the distributed program 104. For instance, in the absence of a developer-supplied runtime optimization policy 110, metrics and constraints might be selected that minimize network latency and maximize execution speed while maintaining a reasonable cost of operation. Various factors might be utilized to generate a runtime optimization policy 110 on behalf of the developer 102. If a runtime optimization policy 110 is required but not provided, a query might also be transmitted to the responsible developer 102 requesting that the developer 102 provide the runtime optimization policy 110.

A Web service API, command line interface, Web-based user interface, or other type of interface might be provided through which a developer 102 can specify the runtime optimization policy 110. For instance, a Web-based user interface might be provided through which a developer 102 can specify that the distributed program 104 should be optimized for speed of execution and set constraints on the costs that might be incurred during optimized execution. Such an interface might also provide functionality for specifying other types of metrics, constraints and preferences regarding the optimization of the deployment and execution of a distributed program 104.

The runtime optimization policy 110 and the meta-description 108, if provided, may be utilized to optimize aspects of the distributed program 104 at build time of the program components 106 of the distributed program 104, deployment time of the program components 106 of the distributed program 104, and/or execution time of the program components 106 of the distributed program 104. In one embodiment, the program meta-description 108 and the runtime optimization policy 110 are provided to an optimization component 112 that is configured to determine an optimized configuration and deployment for the various components 106 of the distributed program 104 in view of the meta-description 108 and the specified metrics, constraints and execution preferences. Optimization of the distributed program 104 results in an optimized distributed program 114.

As will be described in greater detail herein, the optimization component 112 operates in conjunction with other components in order to build, deploy and execute the optimized distributed program 114 in a distributed computing environment 116. The distributed computing environment 116 provides facilities for the deployment and execution of the program components 106 and the optimized distributed program 114. The distributed computing environment 116 provides a SOA in one embodiment disclosed herein. It should be appreciated, however, that the technologies disclosed herein might also be utilized with distributed programs executing in other types of distributed computing environments. Additional details regarding the configuration and operation of a distributed computing environment 116 utilized in one embodiment are described below with regard to FIGS. 3-4.

As will be described below with regard to FIGS. 6 and 7A-7G, the optimizations identified and implemented by the optimization component 112 might be performed at many different levels of an operating stack of the distributed computing environment 116. For instance, program components 106 might be containerized into execution environments and re-located to different data centers or server computers within the distributed computing environment 116 in order to optimize their execution. For instance, a containerized JAVA virtual machine ("JVM") might be utilized to move JAVA programs around within the distributed computing environment 116 for optimized execution. Similarly, a containerized JAVASCRIPT engine might be utilized to move JAVASCRIPT programs around within the distributed computing environment 116 for optimized execution.

Other types of optimizations that might be performed include, but are not limited to: automatically binding containers to appropriate frameworks; moving processes closer to data that the processes operate upon; placing two related components that communicate with one another in the same data center, server computer, virtual machine, or execution environment; placing components in different data centers, server computers, virtual machines, or execution environments to improve scalability; optimizing inter-component communication; resource and dependency sandboxing; auto-deployment of program components; auto-establishment of service endpoints; auto-scaling of virtual machine instances; automatic parallelization; pre-computation; map/reduce; and multi-branch evaluation. Other types of optimizations might also be utilized.

Appropriate execution strategies might also be selected by the optimization component 112 and utilized to compile and/or execute the program components 106 of a distributed program 104 in an optimized manner. Execution strategies include, but are not limited to: sequential, synchronous execution; greedy parallel, single host, synchronous execution; heuristically parallel, single host, synchronous execution; parallel, multi-host synchronous execution; sequential, asynchronous execution; parallel, asynchronous execution; caching execution; pre-computing execution; eager branch execution; and multiple call, single result execution. Other types of execution mechanisms and/or strategies might also be utilized.

It should be appreciated that the optimizations described above might also be used individually or in combination. These optimizations might also be performed in view of relevant service level agreements ("SLAs") entered into by the owner and/or operator of the distributed computing environment 116. New execution strategies and/or optimization techniques might also be placed into service as they are developed and utilized to further optimize existing distributed programs 104. Optimizations might also be modified over time in response to changes in the behavior of a distributed program 104. These types of dynamic runtime optimizations can be performed without additional effort by a developer 102 of a distributed program 104. Details regarding these and other mechanisms for optimizing a distributed program 104 are provided below.

It should be appreciated that the configuration shown in FIG. 1, and the other figures presented herein, has been greatly simplified for discussion purposes and that many more hardware and software components might be utilized in order to provide the functionality described herein. In this regard, it should also be appreciated that the functionality described herein as provided by the optimization component 112 might be provided by a single component or multiple components, including various combinations of components operating within or external to the distributed computing environment 116. Other implementations will become apparent to those skilled in the art.

Figure 2:
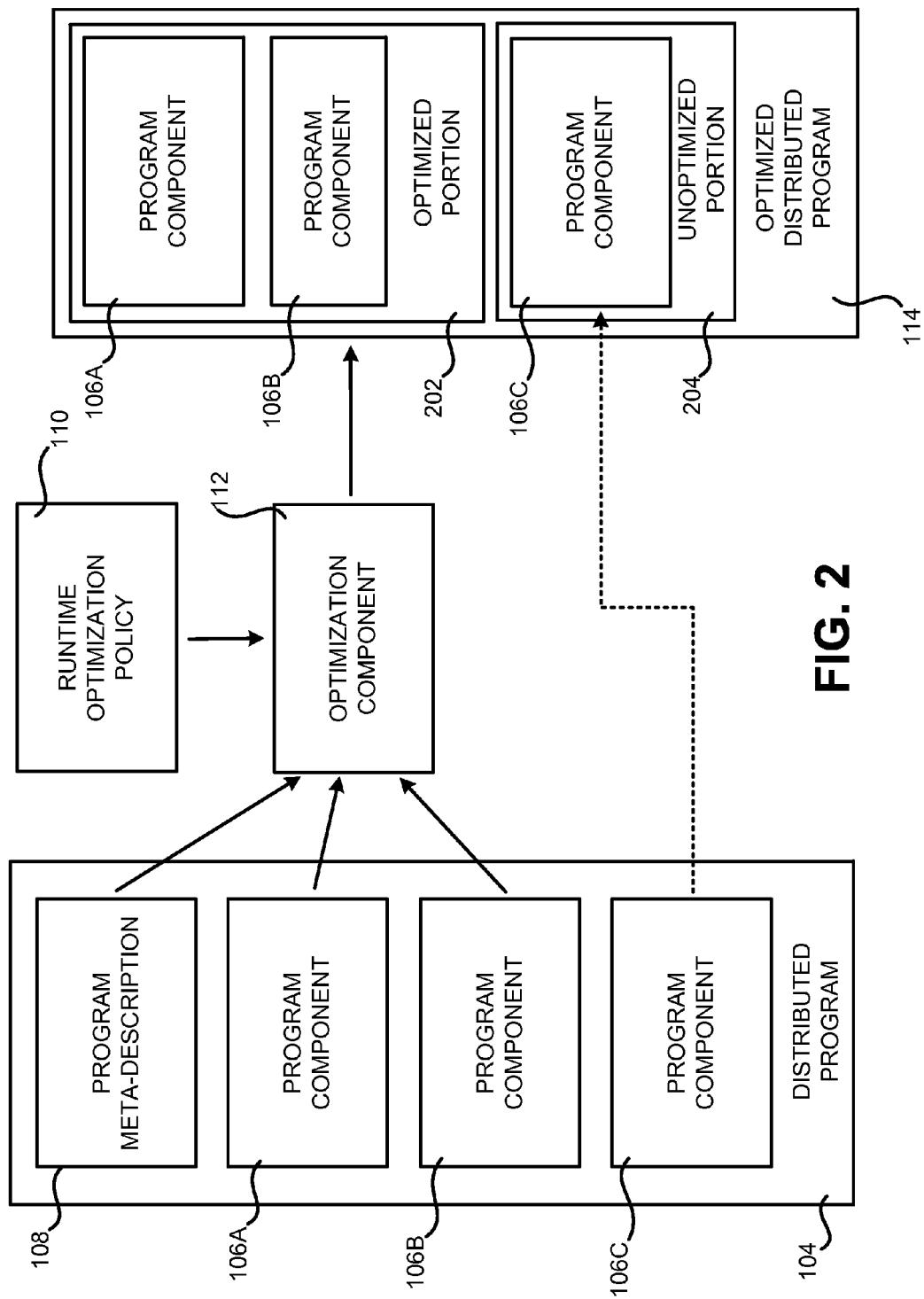
FIG. 2 is a software architecture diagram showing additional aspects of one mechanism presented herein for optimized deployment and execution of programs in a distributed computing environment.

FIG. 2 is a software architecture diagram showing additional aspects of one mechanism presented herein for optimized deployment and execution of distributed programs 104 in a distributed computing environment 116. As discussed above, the optimization component 112 utilizes a meta-description 108 for a distributed program 104 and a runtime optimization policy 110 to optimize the deployment and execution of the distributed program 104 and create an optimized distributed program 114.

It should be appreciated, however, that it is not necessary for the optimization component 112 to optimize the deployment and execution of all of the program components 106 that make up a distributed program 104. Only a subset of the program components 106 utilized in a distributed program 104 might be optimized. For instance, in the example shown in FIG. 2, the optimization component 112 is optimizing aspects of the deployment and/or execution of the program components 106A and 106B, thereby creating an optimized portion 202 of the optimized distributed program 114. In this example, the optimization component 112 has not, however, performed any optimization upon the program component 106C, thereby resulting in an un-optimized portion 204 of the optimized distributed program 114.

Optimizing only a subset of the program components 106 in a distributed program 104 permits the optimization of existing distributed programs 104 that include program components 106 implemented using many different technologies, all of which may not be appropriate for optimization. As an example, if a distributed program 104 utilizes a program component 106 that cannot be optimized for some reason, then the remainder of the program components 106 within the distributed program 104 may still be optimized. The optimization component 112 might be initially configured to optimize only components 106 that have been implemented utilizing JAVA, for instance. Those program components 106 of a distributed program 104 that have been implemented utilizing C++ would not be optimized. However, functionality could later be added to the optimization component 112 for optimizing the deployment and execution of C++ programs. Other types of optimization features might also be added to the optimization component 112 at a later time.

Figure 3:
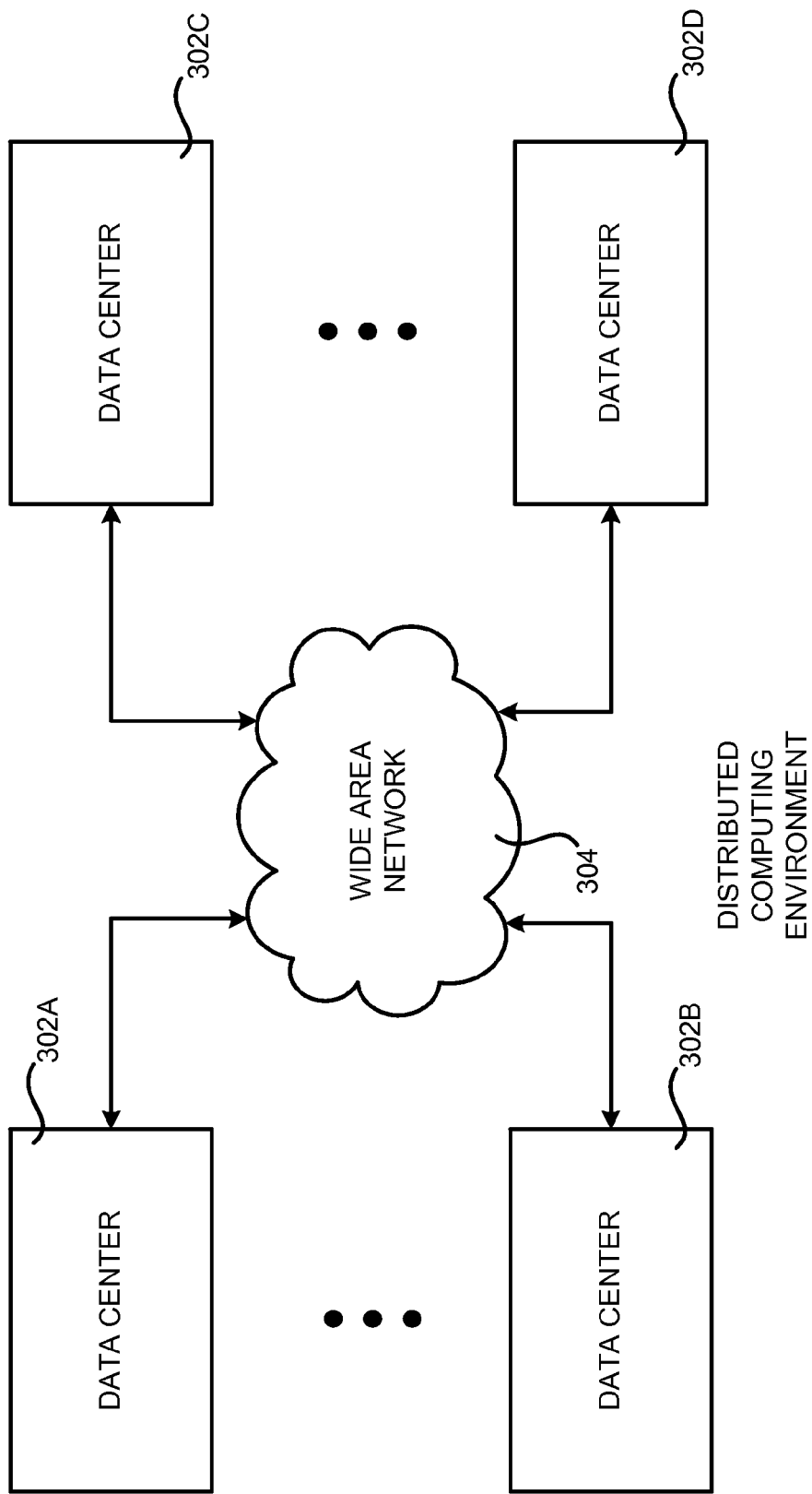
FIG. 3 is a network diagram showing aspects of a distributed computing environment that provides an operating environment for the various concepts and technologies disclosed herein in embodiments.

FIG. 3 is a network diagram showing aspects of a distributed computing environment that provides an operating environment for the various concepts and technologies disclosed herein in embodiments. FIG. 3 and the following description are intended to provide a brief, general description of a suitable computing environment in which the embodiments described herein may be implemented. The distributed computing environment shown in FIG. 3 is configured using a SOA one implementation. Other configurations might also be utilized.

The distributed computing environment can provide computing resources for executing distributed programs 104 on a permanent or an as-needed basis. The computing resources provided by the distributed computing environment may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute programs, including Web servers, application servers, media servers, database servers, and other types of components. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the distributed computing environment are furnished by server computers and other components operating in one or more data centers 302A-302D (which may be referred to herein singularly "as a data center 302" or collectively as "the data centers 302"). The data centers 302 are facilities utilized to house and operate computer systems and associated components for providing a distributed computing environment. The data centers 302 typically include redundant and backup power, communications, cooling, and security systems. The data centers 302 might also be located in geographically disparate locations. One illustrative configuration for a data center 302 that implements aspects of the concepts and technologies disclosed herein for optimized deployment and execution of programs in a distributed computing environment will be described below with regard to FIG. 4.

Users of the distributed computing environment may access the computing resources provided by the data centers 302 over a wide-area network ("WAN") 304. Although a WAN 304 is illustrated in FIG. 3, it should be appreciated that a local-area network ("LAN"), the Internet, or any other networking topology known in the art that connects the data centers 302 to remote customers and other users may be utilized. It should also be appreciated that combinations of such networks might also be utilized.

The distributed computing environment might provide various interfaces through which aspects of its operation may be configured. For instance, various application programming interfaces ("API") may be exposed by components operating in the distributed computing environment for configuring various aspects of its operation. Other mechanisms for configuring the operation of components in the distributed computing environment might also be utilized.

According to embodiments disclosed herein, the capacity of resources provided by the distributed computing environment can be scaled in response to demand. In this regard, scaling refers to the process of instantiating (which may also be referred to herein as "launching" or "creating") or terminating (which may also be referred to herein as "descaling") instances of computing resources in response to demand.

Auto scaling is one mechanism for scaling computing resources in response to increases or lulls in demand for the resources. Auto scaling allows customers of the distributed computing environment to configure the environment to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand.

The distributed computing environment might also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources. Additional details regarding the functionality provided by the data centers 302 will be provided below with regard to FIG. 4.

Figure 4:
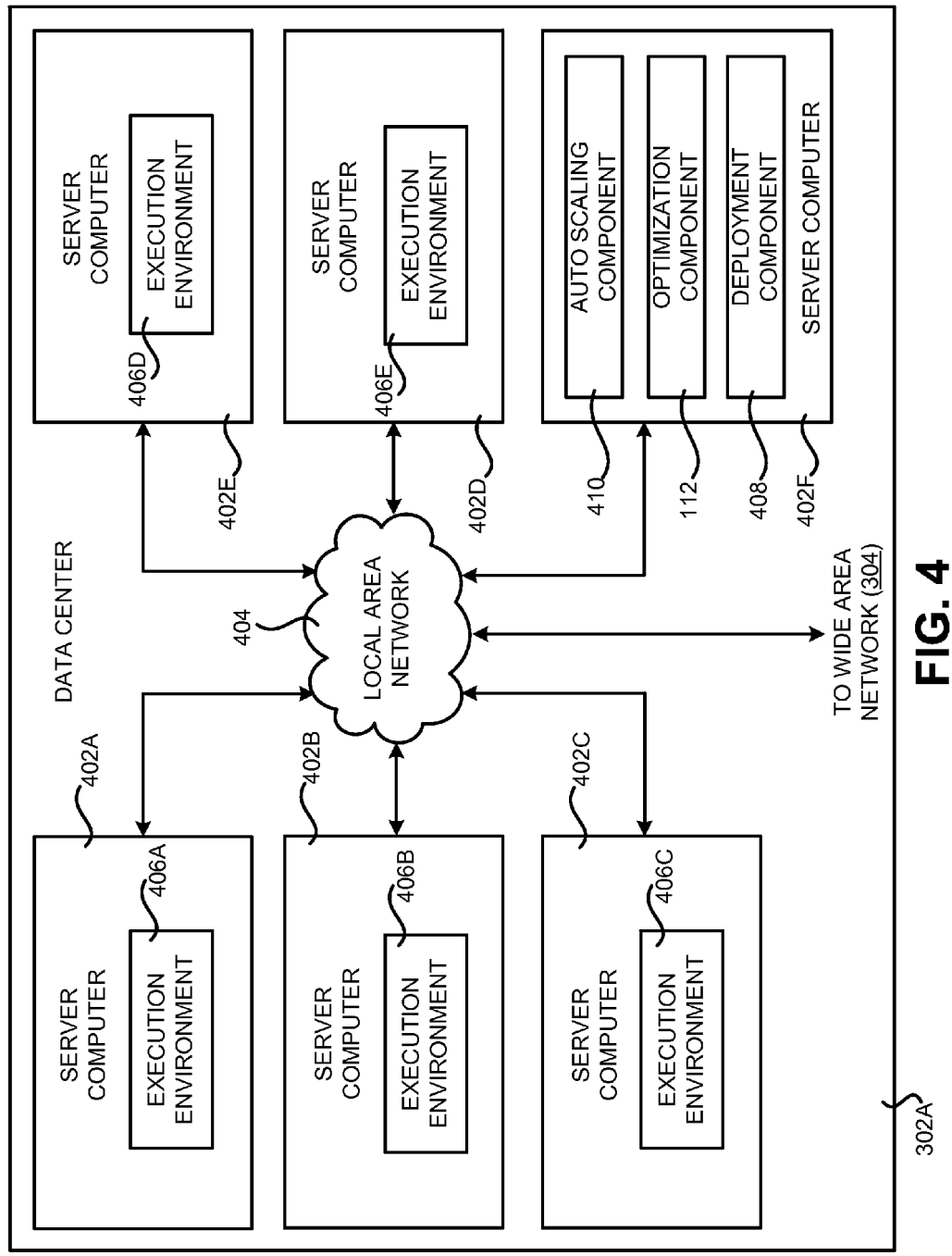
FIG. 4 is a computing system diagram that illustrates a configuration for a data center that might be utilized to implement some of the concepts and technologies disclosed herein for optimized deployment and execution of programs in a distributed computing environment, according to one embodiment.

FIG. 4 is a computing system diagram that illustrates a configuration for a data center 302A that might be utilized to implement the concepts and technologies disclosed herein for optimized deployment and execution of distributed programs 104 in a distributed computing environment. The example data center 302A shown in FIG. 4 includes several server computers 402A-402D (which may be referred to herein singularly as "a server computer 402" or in the plural as "the server computers 402") for providing computing resources for executing distributed programs 104.

The server computers 402 may be standard tower or rack-mount server computers configured appropriately for executing a distributed program 104. For example, the server computers 402 might be configured to execute the various program components 106 of the distributed program 104 and to enable data communication between the program components 106 and other computing systems.

The server computers 402 might execute the program components 106 directly. For instance, the server computers 402 might execute an operating system and execute the program components 106 directly on the operating system. Compiled C++ programs, for instance, might be executed in this manner. The server computers 402 might also be configured to execute a virtual machine manager ("VMM") on top of an executing operating system. The VMM might be a hypervisor or another type of program configured to enable and manage the execution of multiple instances on a single server 402, for example. Compiled and other types of programs might be executed in the virtual machine instances.

Programs that need other types of execution environments to execute might also be executed within execution environments executing on the server computers 402 or within virtual machine instances. For example, JAVA and JAVASCRIPT programs might be executed in this manner. Other types of execution environments might be provided on the server computers 402 for executing procedural programs, scripts, compiled or interpreted programs and other types of programs. Additionally, each server computer 402 might be configured to provide multiple execution environments. For example, a single server might provide functionality for executing virtual machine instances, JAVA programs, JAVASCRIPT programs, and other types of programs.

As will be discussed in detail below, the program components 106 may be containerized in various embodiments to provide flexibility in locating the program components 106 in the distributed execution environment for efficient execution. Containerization refers to a process of integrating one or more program components within an appropriate and re-locatable execution environment. For instance, a JAVASCRIPT program might be containerized within an execution environment for executing the JAVASCRIPT program. The containerized JAVASCRIPT program can then be deployed to a server computer 402 within the distributed computing environment identified for efficient execution. Additional details regarding this process will be provided below with regard to FIGS. 7A-7G.

The data center 302A shown in FIG. 4 also includes a server computer 402F reserved for executing software components for managing the operation of the data center 302A and the server computers 402. In particular, the server computer 402F might execute the optimization component 112 described briefly above. As mentioned previously, the optimization component 112 utilizes a meta-description 108 and a runtime optimization policy 110 to optimize the execution of a distributed program 104.

Once the optimization component 112 has determined an optimized configuration for the distributed program 114, the optimization component 112 might utilize other components to deploy and execute the components 106 of the optimized distributed program 114 on the servers 402 in the data center 302A and, potentially, other data centers 302. For example, the optimization component 112 might utilize a deployment component 408 to assist in the deployment of the program components 106 to server computers 402 in the data center 302A or other data centers 302 within the distributed computing environment.

In embodiments, the optimization component 112 also utilizes an auto scaling component 410 to auto scale instances of computing resources, like virtual machine instances, in response to fluctuations in demand for the resources. The auto scaling component 410 and the deployment component 112 may execute on a single server computer 402F or in parallel across multiple server computers 402 in the data center 302A.

In addition, the auto scaling component 410 and the deployment component 408 may consist of a number of subcomponents executing on different server computers 402F or other computing devices in the distributed computing environment. The auto scaling component 410 and the deployment component 408 may be implemented as software, hardware or any combination of the two. The auto scaling component 410 may monitor available computing resources in the distributed computing environment over an internal management network, for example.

It should be appreciated that the architecture of the server computers 402 shown in FIG. 4 has been simplified for discussion purposes. In this regard, the components illustrated as executing on the server computer 402F are merely illustrative. Many other software and hardware components might also be utilized to build, configure, deploy and execute the program components 106 of the distributed program 104 in an optimized way.

In the example data center 302A shown in FIG. 4, an appropriate LAN 404 is utilized to interconnect the server computers 402. The LAN 404 is also connected to the WAN 304 illustrated in FIG. 3. It should be appreciated that the network topology illustrated in FIGS. 3 and 4 has also been greatly simplified for discussion purposes and that many more networks and networking devices may be utilized to interconnect the various computing systems disclosed herein. Appropriate load balancing devices or software modules might also be utilized for balancing a load between each of the data centers 302, between each of the server computers 402 in each data center 302, and between instances executing within the distributed computing environment. These network topologies and devices should be apparent to those skilled in the art.

It should also be appreciated that the data center 302A described in FIG. 4 is merely illustrative and that other implementations might be utilized. In particular, functionality described herein as being performed by the optimization component 112, the auto scaling component 410, and the deployment component 408 might be performed by one another, might be performed by other components, or might be performed by a combination of these or other components. Additionally, it should be appreciated that this functionality might be implemented in software, hardware or a combination of software and hardware. Other implementations should be apparent to those skilled in the art.

Figure 5:
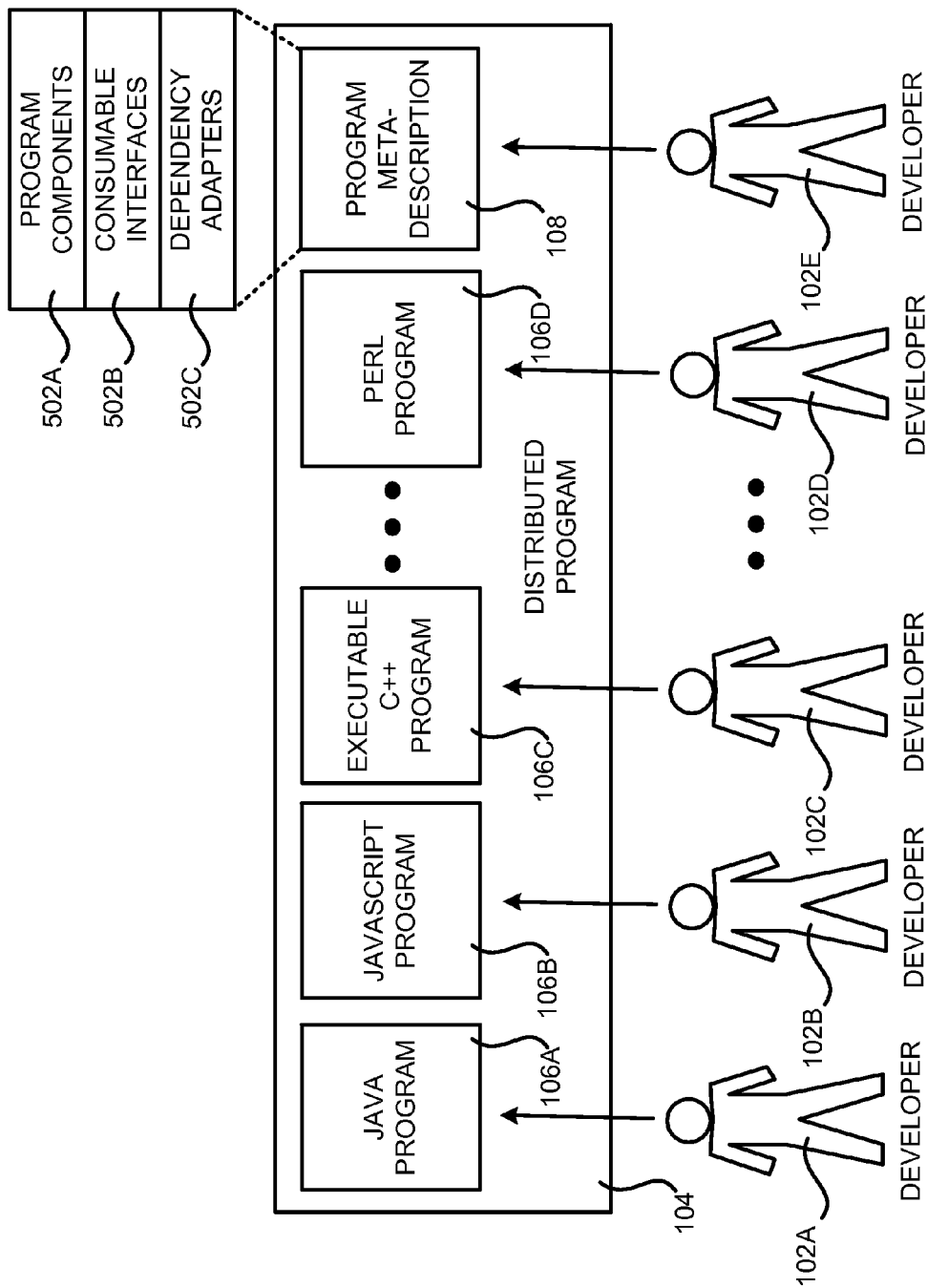
FIG. 5 is a software architecture diagram that illustrates aspects of a distributed program and a meta-description of the distributed program utilized to optimize execution of the distributed program, according to one embodiment disclosed herein.

FIG. 5 is a software architecture diagram that illustrates additional aspects of a distributed program 104 and a meta-description 108 of the distributed program 104 utilized to optimize deployment and execution of the distributed program 104, according to one embodiment disclosed herein. As shown in FIG. 5 and briefly described above, a number of software developers 102A-102E might independently create and deploy program components 106 that are utilized by a distributed program 104.

The program components 106 might be created by the developers 102 utilizing different technologies suitable for use in creating applications that are executable in a distributed computing environment that implements a SOA. For instance, in the example shown in FIG. 5, the program component 106A has been created using JAVA, the program component 106B has been created using JAVASCRIPT, the program component 106C has been created using C++, and the program component 106D has been created using PERL.

The distributed program 104 might be configured to make use of each of the program components 106 shown in FIG. 5, even though these program components 106 have been authored by different, independent developers 102 using different technologies. As mentioned briefly above, the optimization of the distributed program 104 as described herein does not impact the independence that each of the developers 102 has to independently author and deploy program components 106 using the technologies of their own choosing.

As also shown in FIG. 5 and described briefly above, a developer 102E of the distributed program 104 might generate a meta-description 108 for the distributed program 104. The meta-description 108 is a high-level description of the execution of the various program components 106 that make up the distributed program 104. The meta-description 108 might be expressed using a standardized meta-programming language, such as XML syntax for representing graphs. Other languages and mechanisms might also be utilized to describe create a meta-description 108 that describes the configuration and operation of the program components 106 of a distributed program 104.

In one implementation, the meta-description 108 includes data 502A that identifies the program components 106 that make up the distributed program 104. The meta-description 108 might also include, for each of the program components 106, data 502B that defines the consumable interfaces exposed by the program components 106. The consumable interfaces are interfaces exposed by the program components 106 that can be called by other program components 106. The data 502B might also identify other program components 106 that call the consumable interfaces.

In embodiments, the meta-description 108 also includes, for each of the program components 106, data 502C that defines the dependency adapters called by the program components 106. The dependency adapters are interfaces that the program components 106 might call. Additional details regarding the form and content of the meta-description 108 utilized in one embodiment disclosed herein are provided below with regard to FIG. 6.

Figure 6:
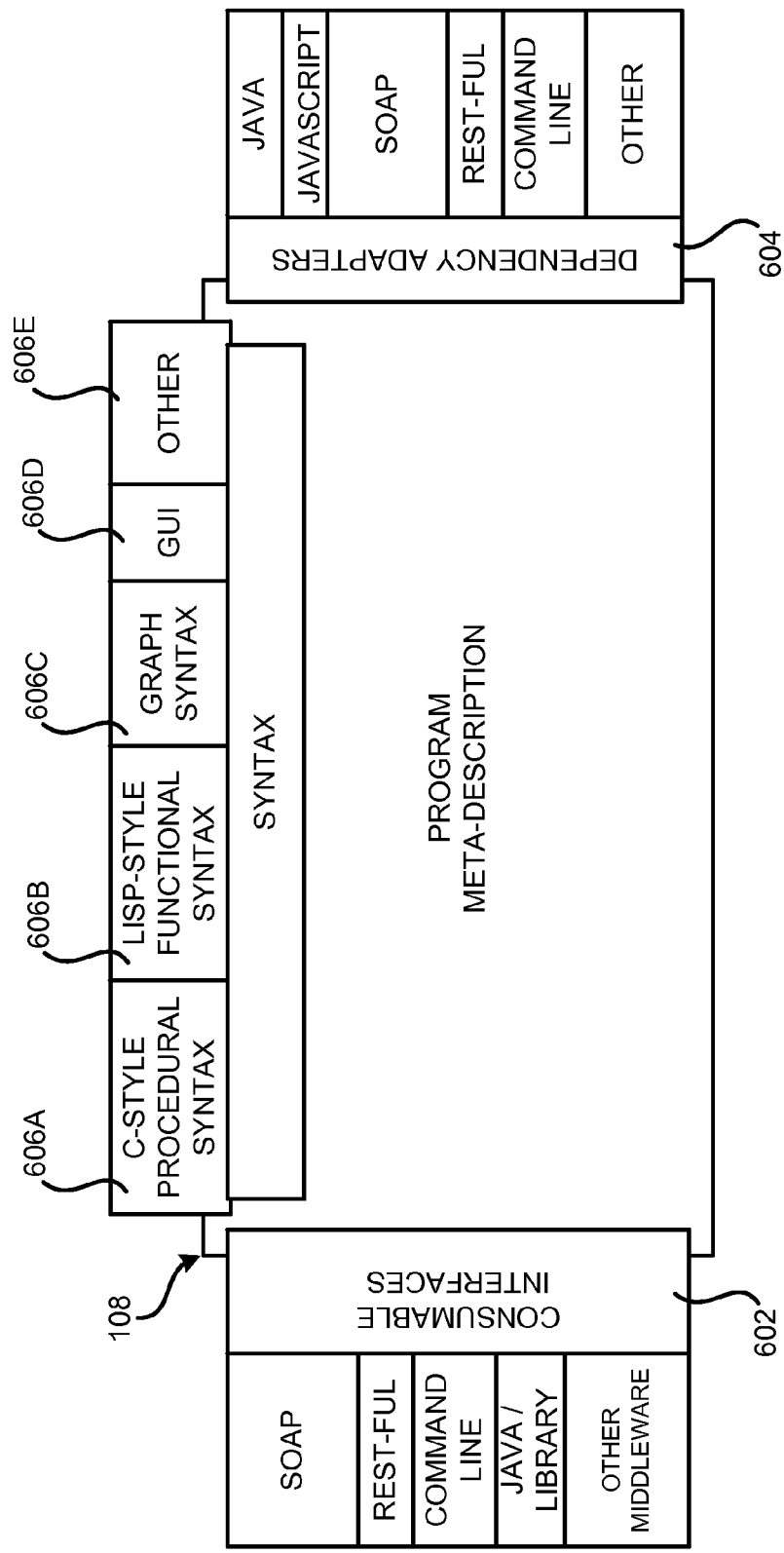
FIG. 6 is a data structure diagram showing additional aspects regarding a distributed program meta-description utilized to optimize execution of the distributed program in various embodiments disclosed herein.

FIG. 6 is a data structure diagram showing additional aspects regarding the meta-description 108 that might be utilized to optimize the deployment and execution of a distributed program 104 in various embodiments disclosed herein. In particular, the top portion of FIG. 6 specifies several illustrative syntaxes that might be utilized to specify the program meta-description 108. For instance, a C-style procedural syntax 606A, a Lisp-style functional syntax 606B, or a graph syntax 606C might be utilized to specify the meta-description 108. Additionally, an appropriate GUI 606D might also be provided through which a developer 102 can specify the meta-description 108 for a distributed program 104. Other syntaxes 606E might also be utilized in other embodiments.

The left hand side of FIG. 6 specifies the various consumable interfaces 602 exposed by the program components 106 of the distributed program 104. For instance, various interfaces 602 might be exposed by a program component 106 such as, but not limited to, a Simple Object Access Protocol ("SOAP") interface, a RESTful interface, a command line interface, and/or a JAVA or library interface. Other types of interfaces 602 might also be exposed by the program components 106 of a distributed program 104.

The right hand side of FIG. 6 specifies one or more dependency adapters 604 utilized by each program component for binding to dependencies. For instance, and without limitation, program components 106 might call JAVA, JAVASCRIPT, SOAP, RESTful, and command line interfaces exposed by other program components. The program components might also call other types of adapters not illustrated in FIG. 6.

Figure 7G:
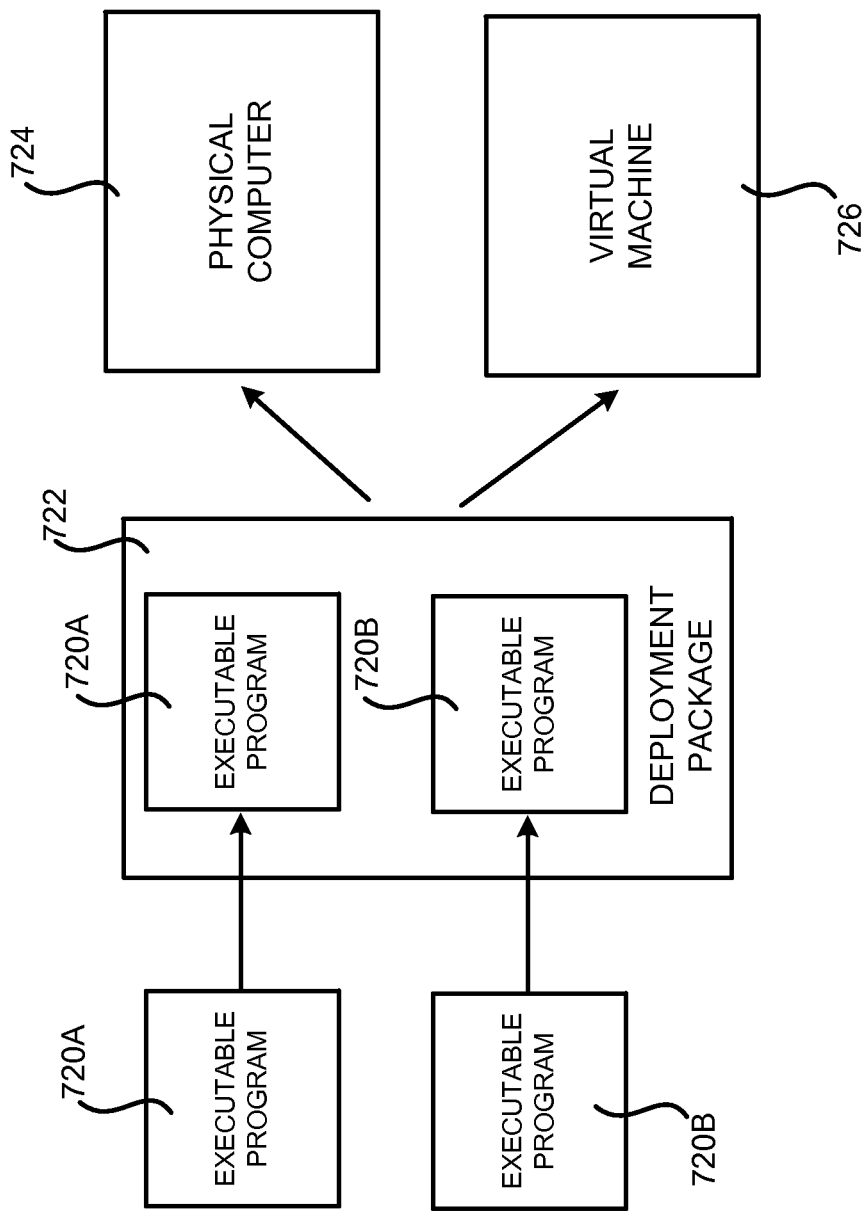

FIGS. 7A-7G are software architecture diagrams illustrating the containerization of various types of program components 106, according to embodiments disclosed herein. As mentioned briefly above, the program components 106 of a distributed program 104 might be containerized in order to provide flexibility in locating the program components 106 in the distributed execution environment for efficient execution. As also mentioned above, containerization refers to a process of integrating one or more program components 106 within an appropriate and re-locatable execution environment. For instance, and as shown in FIGS. 7A and 7B, JAVA programs 702A and 702B that typically execute in separate JAVA virtual machines ("JVMs") 704A and 704B, respectively, might be placed in a containerized JVM 706 for execution.

The optimization component 112 might determine that one or more program components 106 of the distributed program 104 should be containerized in order to optimize for the metrics specified by the developer 102 of a distributed program 104. In response thereto, the optimization component 112 might work in conjunction with other components to perform the containerization. The optimization component 112 might then operate with the deployment component 408 to deploy the containerized program component 106 to a server computer 402 selected to optimize the execution of the distributed program 104 that utilizes the containerized program component 106. The server computer 402 to which the JVM 706 is deployed might be selected to maximize the efficiency of execution of the JAVA programs 702A and 702B in the context of the entire distributed program 104 and the metrics and constraints specified by the developer of the distributed program 104.

In a similar fashion, the JAVASCRIPT programs 708A and 708B, which ordinarily execute in separate JAVASCRIPT engines 710A and 710B, respectively, might be containerized into the containerized JAVASCRIPT engine 712. Containerizing in this fashion provides significant flexibility in selecting a server for executing the JAVASCRIPT programs. It should be appreciated, however, that containerization of program components 106 in the manner presented above is not limited to JAVA and JAVASCRIPT programs.

For instance, as shown in FIGS. 7E and 7F, executable C++ programs 714A and 714B that typically execute in separate virtual machines 716A and 716B might be containerized into a containerized virtual machine 718 for execution. Similarly, as shown in FIG. 7G, other types of executable programs 720A and 720B might be containerized into other types of deployment packages 722 for deployment and execution on a physical computer 724 or a virtual machine 726. In this regard, it should be appreciated that the examples shown in FIGS. 7A-7G are merely illustrative and that many other types of program components might be containerized into other types of containers for execution within a distributed computing environment.

As also mentioned briefly above, once the program components 106 have been containerized, the containers can be deployed to locations in the distributed computing environment in order to optimize for the metrics and constraints specified by the developer of the distributed program 104. For instance, containers may be located close together (i.e. on the same server, in the same rack of servers, or in the same data center) when possible to reduce latency and data movement between the containerized programs. Similarly, containerized programs might be placed close together or close to dependent resources in order to eliminate or reduce remote network calls. Other types of optimizations might also be performed on containerized and non-containerized program components 106. Other types of optimizations will be described below with regard to FIGS. 14A-17.

Figure 8:
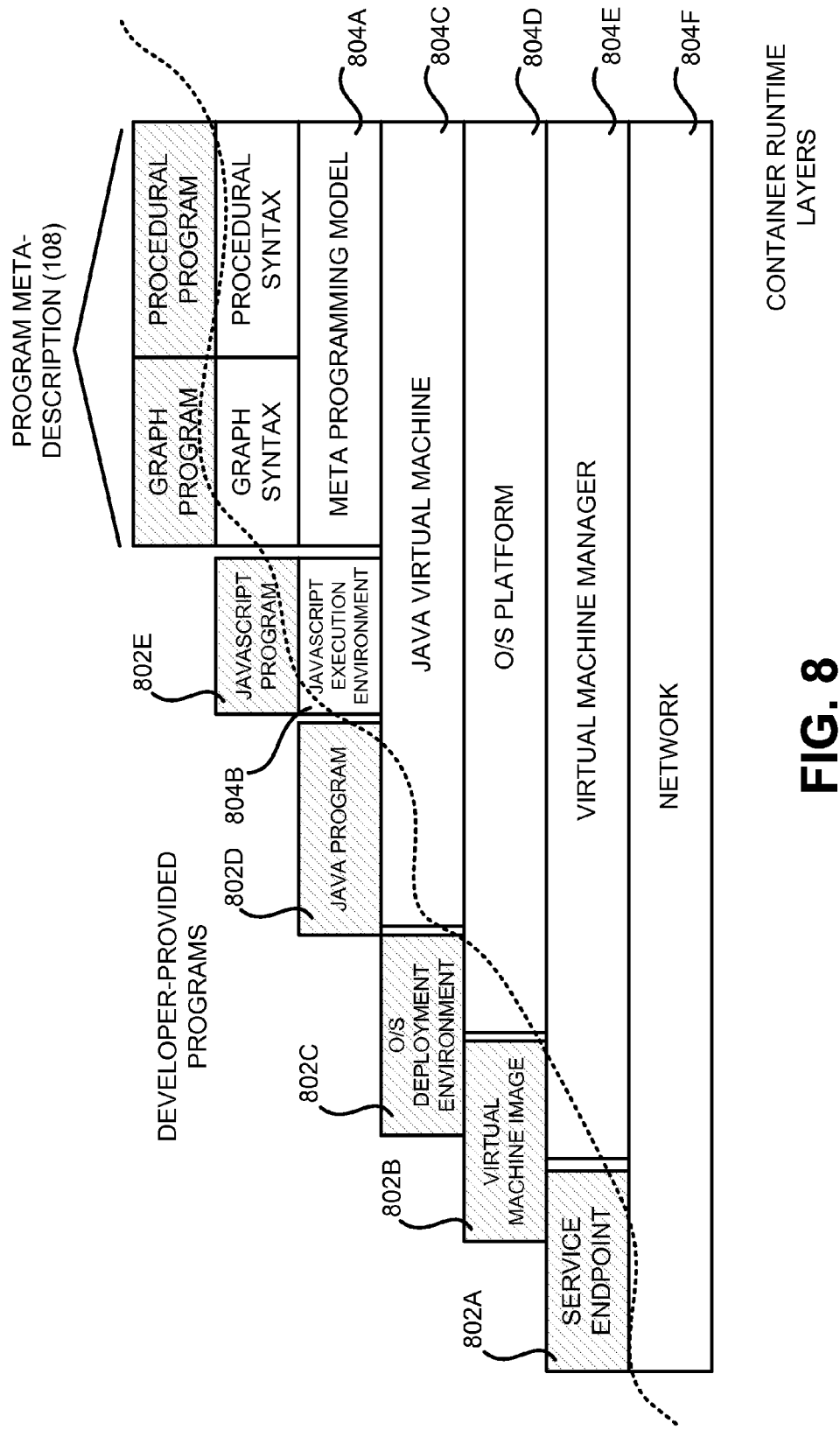
FIGS. 8 and 9 are stack diagrams illustrating aspects of the execution and optimization of components at various levels of an operating stack of a distributed computing environment, according to embodiments disclosed herein.
Figure 9:
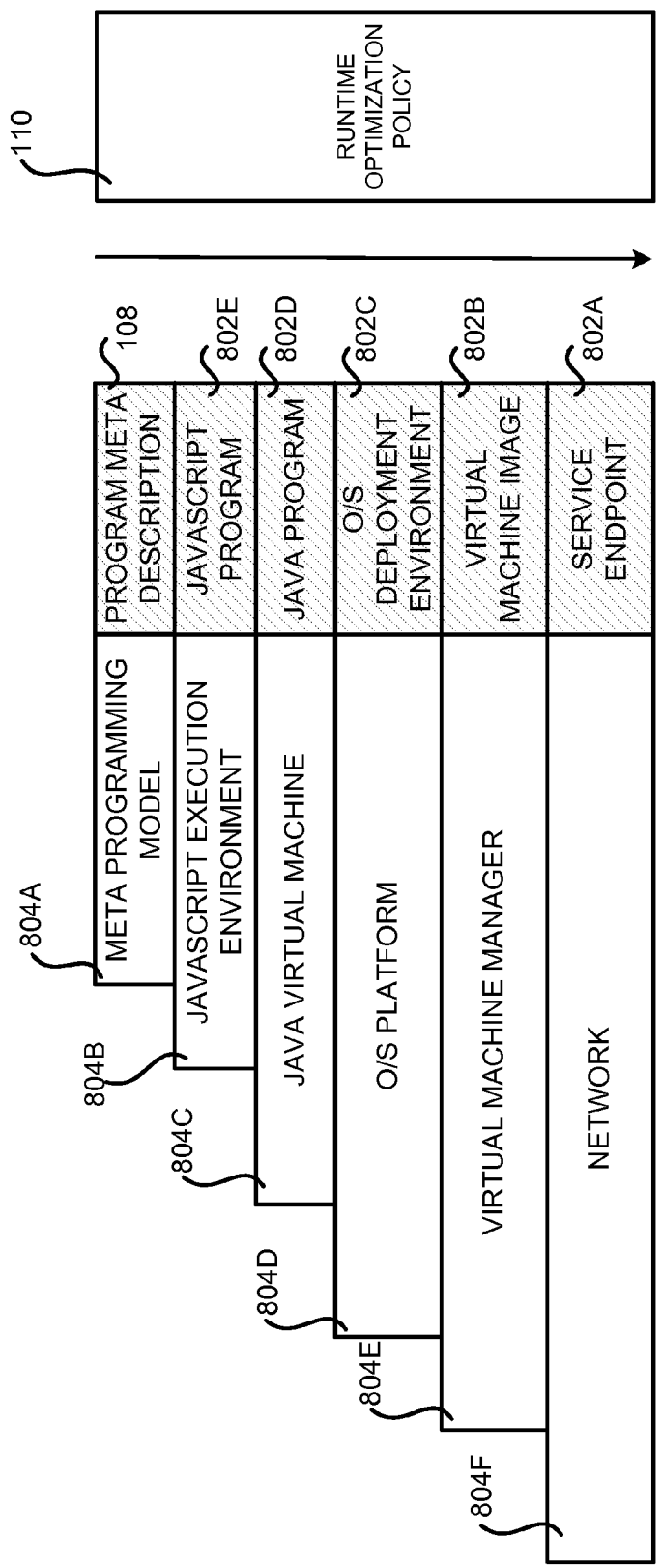

FIGS. 8 and 9 are stack diagrams illustrating aspects of the execution and optimization of program components 106 at various levels of an operating stack of a distributed computing environment. In particular, FIG. 8 illustrates various layers of a SOA implemented by a distributed computing environment in one implementation. According to the various embodiments disclosed herein, the optimization component 112 might identify and implement optimizations to a distributed program 104 at virtually any layer of the execution stack.

For example, the optimization component 112 might optimize execution by co-locating two or more service endpoints 802A on a network 804F in order to optimize their execution in the context of the distributed program 104. Similarly, the optimization component 112 might configure two or more virtual machine images 802B for execution by the same VMM 804E in order to optimize their execution. The optimization component 112 might also cause an operating system ("O/S") deployment environment 802C to be deployed on various O/S platforms 804D in order to optimize for the metrics and constraints specified by the developer of the distributed program 104.

In a similar fashion, two or more JAVA programs 802D might be executed on the same JVM 804C in order to optimize their execution. Containerized JAVASCRIPT programs 802E might also be deployed to an appropriate JAVASCRIPT execution environment 804B and placed at an appropriate location in the distributed computing environment in order to optimize their execution. Other program components optimizing at other layers might also be containerized and executed at different locations within the distributed computing environment in order to optimize their execution in the context of the distributed program 104 and the metrics and constraints set forth by the developer of the distributed program 104.

As discussed above, the meta-description 108 and the runtime optimization policy 110 may be utilized to determine appropriate optimizations for the program components 106 of the distributed program 104. FIG. 9 is a stack diagram illustrating this process further. In particular, FIG. 9 illustrates that the runtime optimization policy 110 and the program meta-description 108 may be utilized to perform optimizations from the top of the SOA stack, which includes the JAVASCRIPT execution environment 804B in one embodiment, all the way to the network 804F layer at the bottom of the stack.

The optimization component 112 can utilize the runtime optimization policy 110 and the meta-description 108 of the distributed program 104 to determine appropriate optimizations at the various levels of the stack. The optimization component 112 can then operate in conjunction with other programs and/or components within or external to the distributed execution environment to cause the distributed program 104 to be built, deployed and executed in the determined manner. Additional details regarding this process will be performed below with regard to FIGS. 10-17.

Figure 10:
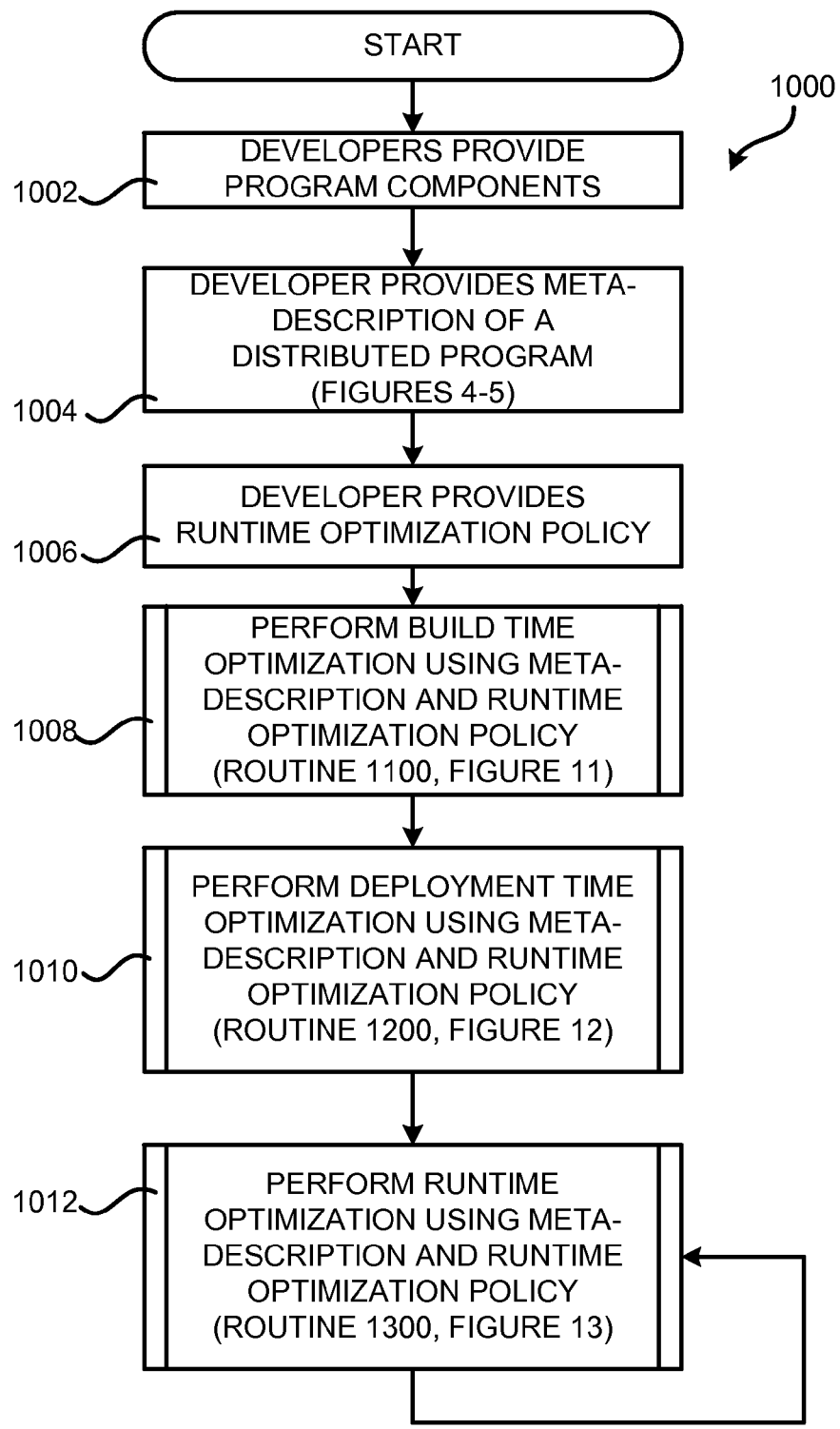
FIG. 10 is a flow diagram showing aspects of one illustrative routine for optimizing the deployment and execution of programs in a distributed computing environment, according to one embodiment disclosed herein.

FIG. 10 is a flow diagram showing aspects of one illustrative routine 1000 for optimizing the deployment and execution of a distributed program 104 in a distributed computing environment, according to one embodiment disclosed herein. It should be appreciated that the logical operations described herein with respect to FIG. 10 and the other figures are implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the Figures and described herein. These operations may also be performed in parallel, or in a different order than those described herein.

The routine 1000 begins at operation 1002, where the developers 102 provide the program components 106 of a distributed program 104. As discussed above, the program components 106 might be developed independently and utilizing different technologies.

From operation 1002, the routine 1000 proceeds to operation 1004, where a developer 102, such as the developer 102A, provides a meta-description 108 of a distributed program 104 that makes use of one or more of the program components 106. As discussed above with regard to FIGS. 4 and 5, the meta-description 108 might identify the various program components 106 utilized by the distributed program 104 and, for each of the program components 106, specify the consumable interfaces exposed and the dependency adapters utilized. The meta-description 108 might also specify other aspects regarding the construction, configuration and/or operation of the distributed program 104.

From operation 1004, the routine 1000 proceeds to operation 1006, where the developer 102A provides the runtime optimization policy 110. As discussed above, the runtime optimization policy 110 specifies one or more metrics for which the deployment and execution of the distributed program 104 should be optimized. The runtime optimization policy 110 might also specify one or more constraints that should also be considered when optimizing the distributed program 104. The runtime optimization policy 110 might also include preferences regarding the manner in which the distributed program 104 is executed. The runtime optimization policy 110 might also include other types of instructions to be considered by the optimization component 112 when determining an optimal deployment and execution strategy for the distributed program 104.

From operation 1006, the routine 1000 proceeds to operation 1008, where the optimization component 112 and/or other components utilize the meta-description 108 and/or the runtime optimization policy 110 to perform build time optimization on the program components 106 of the distributed program 104. As used herein, the term "build time" refers to a time prior to the deployment of the program components 106 within the distributed execution environment. For example, build time might encompass the time at which the program components are compiled and/or linked. Additional details regarding the build time optimization performed by the optimization component 112 will be provided below with regard to FIG. 11.

From operation 1008, the routine 1000 proceeds to operation 1010, where the optimization component 112 and/or other components utilize the meta-description 108 and/or the runtime optimization policy 110 to perform deployment time optimization on the program components 106 of the distributed program 104. As used herein, the term "deployment time" refers to the time at which the program components 106 are deployed to the distributed execution environment by the deployment component 408 or another component. Additional details regarding the deployment time optimization performed by the optimization component 112 will be provided below with regard to FIG. 12.

From operation 1010, the routine 1000 proceeds to operation 1012, where the optimization component 112 and/or other components utilize the meta-description 108 and/or the runtime optimization policy 110 to perform runtime optimization on the program components 106 of the distributed program 104. As used herein, the term "runtime" refers to the time at which one or more of the program components 106 of the distributed program 104 are executed within the distributed execution environment. As will be described in greater detail below with regard to FIG. 13, optimization might be dynamically performed in a continuous fashion as the distributed program 104 is executed. In this way, new optimizations can be applied to the execution of the distributed program 104 as they are developed. Additional details regarding this process and other aspects of the runtime optimization performed by the optimization component 112 will be provided below with regard to FIG. 13.

Figure 11:
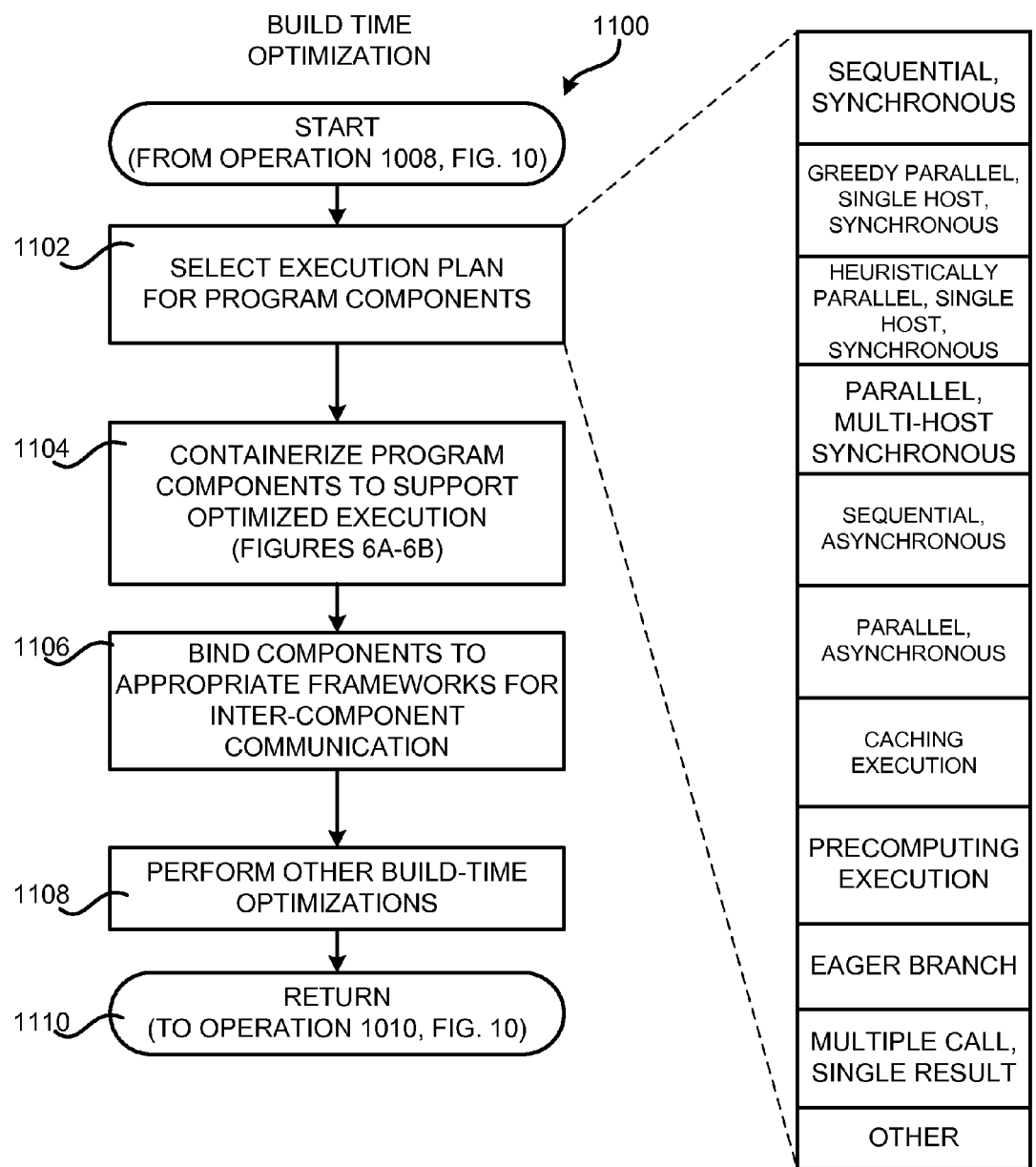
FIG. 11 is a flow diagram showing aspects of one illustrative routine for performing build time optimization of a distributed program, according to one embodiment disclosed herein.

FIG. 11 is a flow diagram showing aspects of one illustrative routine 1100 for performing build time optimization of a distributed program 104, according to one embodiment disclosed herein. The routine 1100 begins at operation 1102, where the optimization component 112 utilizes the meta-description 108 and/or the runtime optimization policy 110 to select an execution plan for the program components 106 of the distributed program 104. The execution plan defines the manner in which each program component 106 will execute at runtime. The execution plan for each component 106 might be selected in order to optimize execution in view of the metrics and constraints specified in the runtime optimization policy 110. Several execution plans might also be used in conjunction.

The right hand side of FIG. 11 illustrates some of the possible execution plans that might be selected by the optimization component 112. In particular, sequential, synchronous execution refers to executing a series of instructions one by one sequentially, where maximum latency is capped, but successful completion is not guaranteed. Greedily parallel, single host, synchronous execution refers to executing a series of instructions with independent instructions each placed into their own execution thread. Heuristically parallel, single host, synchronous execution refers to executing a series of instructions and giving input/output ("I/O") instructions a dedicated thread for non-blocking I/O. Sequences of computational instructions are also assigned to a thread pool no larger than the number of cores on the host computer.

Parallel, multi-host, synchronous execution refers to execution by finding the N largest, or most expensive, independent sub-parts of a program. Each of the identified sub-parts might be registered as private methods on all service workers in a fleet of machines or virtual machine instances. When a request comes in for the initial program, parallel, remote requests are made for each method implementing one of its sub-parts. This type of execution may be tuned to only make a sub-part of a program remote when it is more computationally expensive than the serialization/deserialization required to call that part of the program.

In sequential, asynchronous execution a series of instructions are executed one by one. All of the executed instructions are guaranteed to be completed, but the maximum amount of time this may take is unbounded (asynchronous). In parallel, asynchronous execution a series of instructions are executed, with independent instructions started in sequence. Execution may wait until each independent execution produces a result to continue.

In caching execution, the result for every function call made by a program (e.g. JAVA method, service operation, etc.) is cached in association with the function inputs. The cached value is returned on subsequent calls to the same function with the same input. In precomputing execution, functions are called before they are needed (e.g. on system startup, every N minutes, reactively on a change to an input value, etc.) and results are cached for some set of the most common inputs to each function.

In eager branch execution, both sides of a conditional branch are executed in parallel. When the predicate of the conditional branch returns, the execution of the appropriate thread is continued and the other thread is aborted. In multiple call, single result execution, for any remote service call (or any call that may fail or have widely variable latency independently of input) the call is made N times in parallel. The first result that is returned is utilized. This technique might optimize both reliability and latency at the cost of total cost of ownership.

It should be appreciated that the execution plans described above are merely illustrative and that other plans might be utilized. Additionally, new execution plans might be added and utilized in the future as they are developed.

From operation 1102, the routine 1100 proceeds to 1104, where program components 106 might be containerized, if appropriate, to support optimized execution. Utilizing the meta-description 108 and/or the runtime optimization policy 110, the optimization component 112 can determine which of the program components 106, if any, should be containerized prior to deployment to the distributed computing environment.

From operation 1104, the routine 1100 proceeds to operation 1106. As mentioned above, the optimization component 112 might determine optimal mechanisms for enabling inter-component communication within the distributed computing environment, thereby freeing the developer of the distributed program 104 from specifying all of the implementation details of the distributed program 104. At operation 1106, the optimization component 112 utilizes the meta-description 108 and the runtime optimization policy 110 to determine appropriate frameworks for inter-component communication and binds the program components 106 of the distributed program 104 to the identified frameworks.

From operation 1106, the routine 1100 proceeds to operation 1108, where the optimization component 112 might perform other build time optimizations on the program components 106 of the distributed program 104 to optimize for the metrics and constraints specified by the developer 102 of the distributed program 104. The routine 1100 then proceeds to operation 1110, where it returns to operation 1010 of FIG. 10, where deployment time optimizations are performed in the manner described below with regard to FIG. 12.

Figure 12:
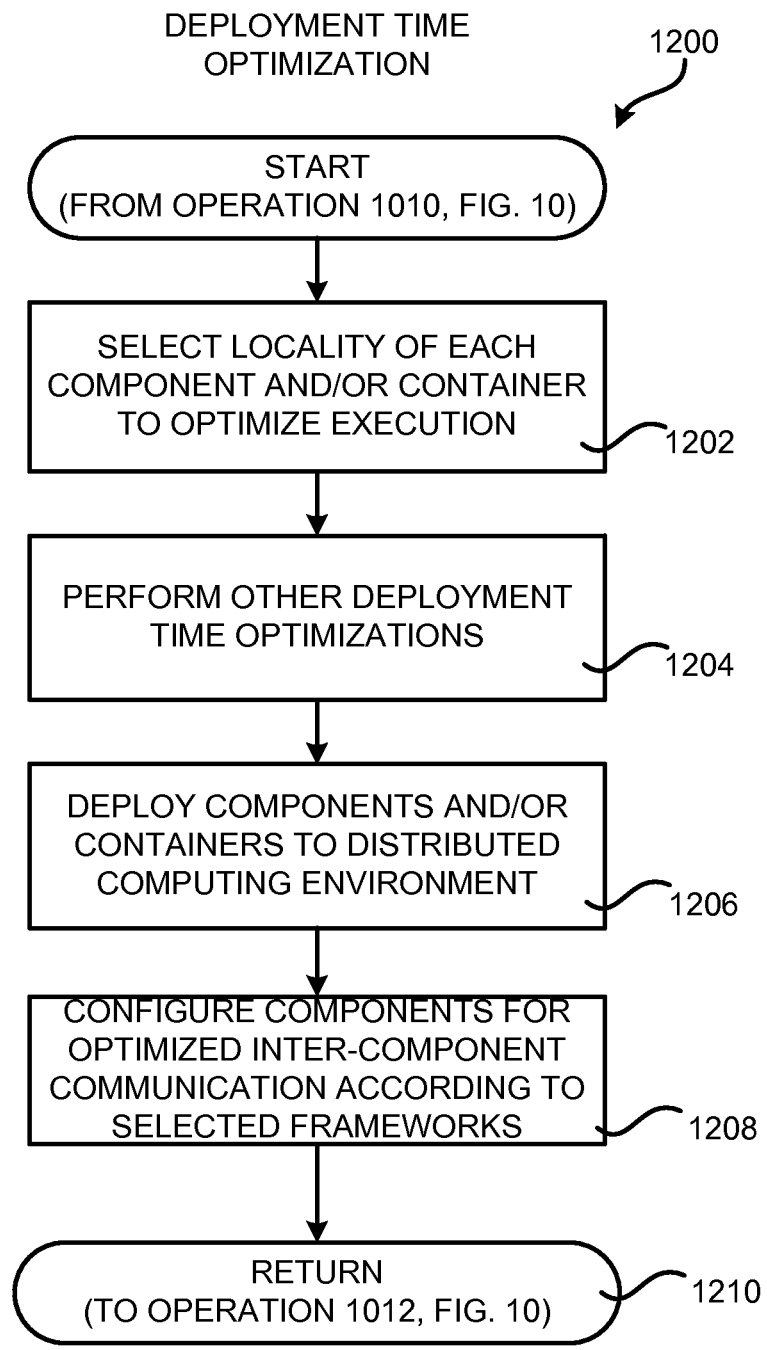
FIG. 12 is a flow diagram showing aspects of one illustrative routine for deployment time optimization of a distributed program, according to one embodiment disclosed herein.

FIG. 12 is a flow diagram showing aspects of one illustrative routine 1200 for deployment time optimization of a distributed program 104, according to one embodiment disclosed herein. The routine 1200 begins at operation 1202, where the optimization component 112 utilizes the meta-description 108 and the runtime optimization policy 110 to select an appropriate location in the distributed execution environment for each of the program components 106. If program components 106 have been containerized in the manner described above, the optimization component 112 may also select locations in the distributed computing environment for optimal execution of the containerized program components in view of the metrics and constraints set forth in the runtime optimization policy 110. It should be appreciated that these processes may be performed in an automated fashion so that the developer 102 of the distributed program 104 does not need to specify where the various components 106 of the distributed program 104 will be executed. At operation 1204, the optimization component 112 might also perform other deployment time optimizations.

From operation 1204, the routine 1200 proceeds to operation 1206, where the optimization component 112 deploys the program components 106 and any containerized program components 106 to the selected locations within the distributed computing environment. For instance, a component 106 might be deployed to a particular data center, to a rack of server computers, to a particular server computer in a rack of server computers, to a virtual machine executing in a certain location, or to another execution environment or locality based upon the location selected at operation 1202 for optimizing the execution of the distributed program 104 in view of the metrics and constraints specified in the runtime optimization policy 110.

From operation 1206, the routine 1200 proceeds to operation 1208, where the optimization component 112 configures the program components 106 for inter-component communication according to the frameworks to which the program components 106 were bound at operation 1106, described above. For example, the internet protocol ("IP") address, port number, and other information might be set for a program component 106 that is based upon the location to which the program component 106 was deployed at operation 1206. Other types of configuration of the deployed program components 106 might also be performed at operation 1208. Once the configuration has been completed, the routine 1200 proceeds to operation 1210, where the routine 1200 returns to operation 1012 of the routine 1000, where runtime optimization is performed in the manner described below with regard to FIG. 13.

Figure 13:
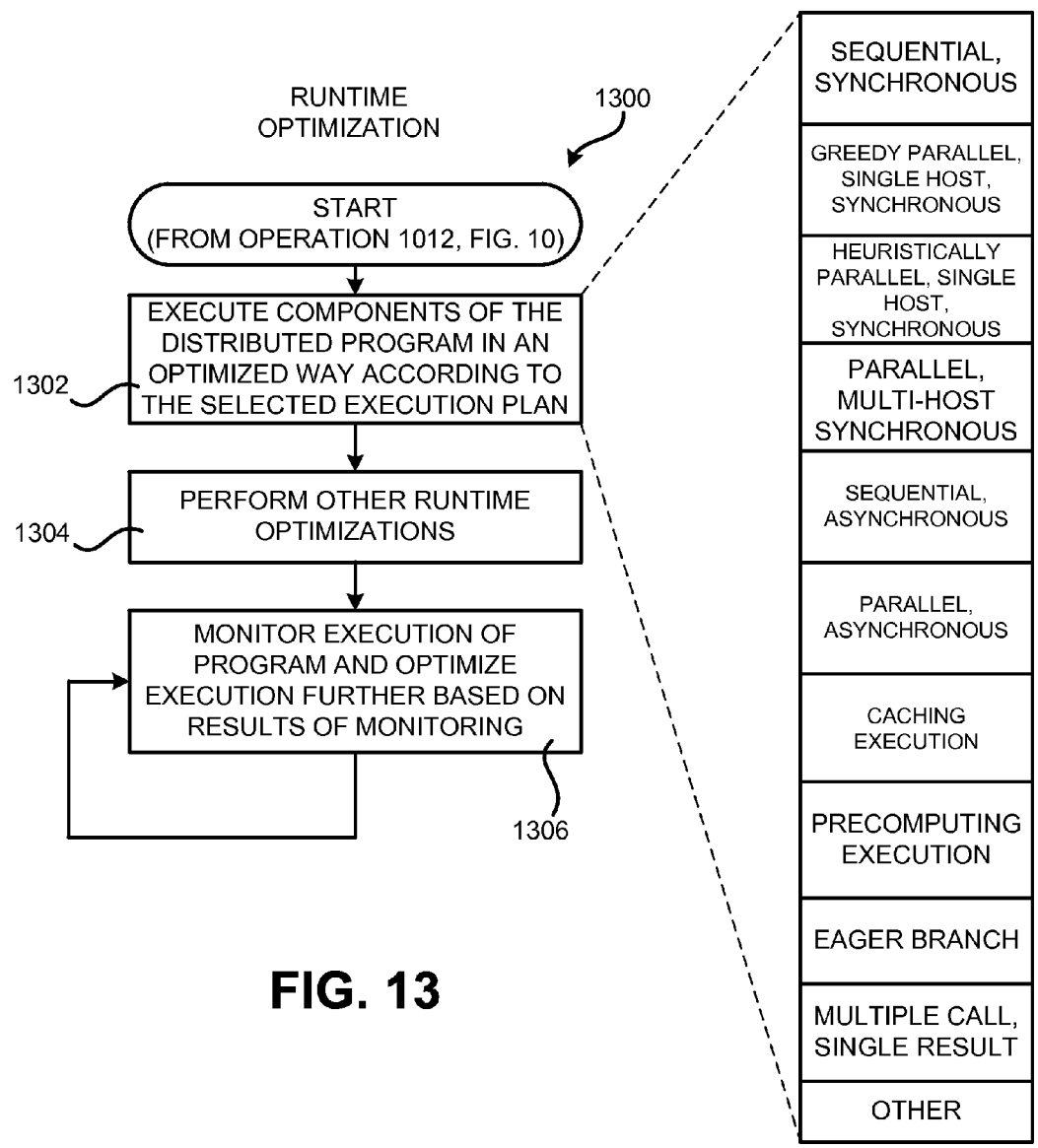
FIG. 13 is a flow diagram showing aspects of one illustrative routine for runtime optimization of a distributed program, according to one embodiment disclosed herein.

FIG. 13 is a flow diagram showing aspects of one illustrative routine 1300 for runtime optimization of a distributed program 104, according to one embodiment disclosed herein. The routine 1300 begins at operation 1302, where the program components 106 of the distributed program 104 are executed utilizing the execution plan selected at operation 1102, described above. From operation 1302, the routine 1300 proceeds to operation 1304, where additional runtime optimizations might also be performed to optimize the execution of the distributed program 104 in view of the metrics, constraints, and preferences specified by the developer 102 of the distributed program 104.

From operation 1304, the routine 1300 proceeds to operation 1306, where the execution of the distributed program 104 is monitored. For instance, resource utilization, inter-process communication, latency, and other aspects of the operation of the distributed program 104 may be monitored. The execution of the distributed program 104 may then be further optimized based upon the results of the monitoring. For example, the execution plan for the components 106 of the distributed program 104 might be modified based upon the actual execution characteristics of the distributed program 104. Similarly, program components 106 might be relocated within the distributed computing environment depending upon the manner in which they are executing.

New execution strategies might also be applied to the execution of the distributed program 104 that were not available at the build time or deployment time of the distributed program 104. For example, new mechanisms for optimization might be added in order to take advantage of advances in hardware or software. This process may continue indefinitely while the program components 106 of the distributed program 104 are executing.

FIGS. 14A-17B are software architecture diagrams illustrating various locality-based mechanisms that might be utilized to optimize communication between program components 106 in a distributed program 104 executing in a distributed computing environment. In particular, the example shown in FIG. 14A includes JAVA programs 1402A and 1402B that are executing in JVMs 1404A and 1404B, respectively. The JAVA programs 1402A and 1402B are also exchanging a significant volume of messages 1406, potentially over a LAN or a WAN.

Figure 14A:
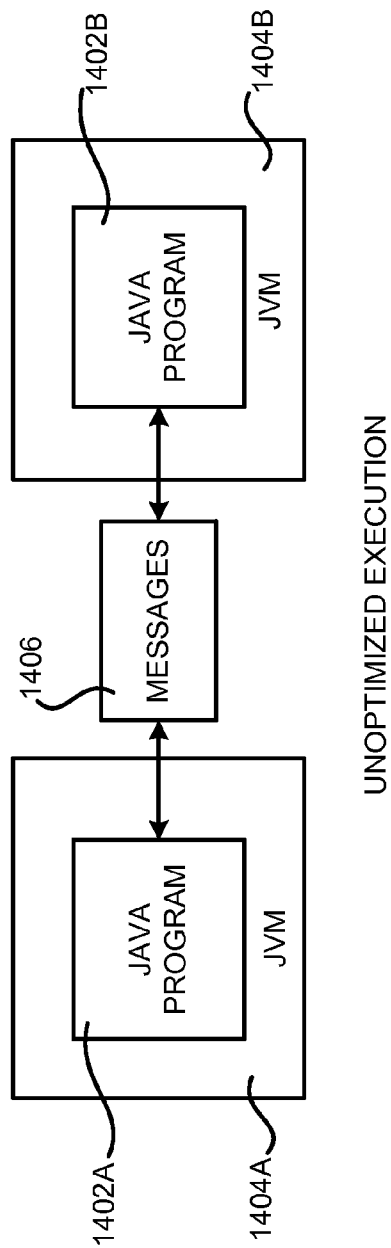
FIGS. 14A-17B are software architecture diagrams illustrating various mechanisms that might be utilized to optimize communication between program components in a distributed program executing in a distributed computing environment, according to various embodiments disclosed herein.
Figure 14B:
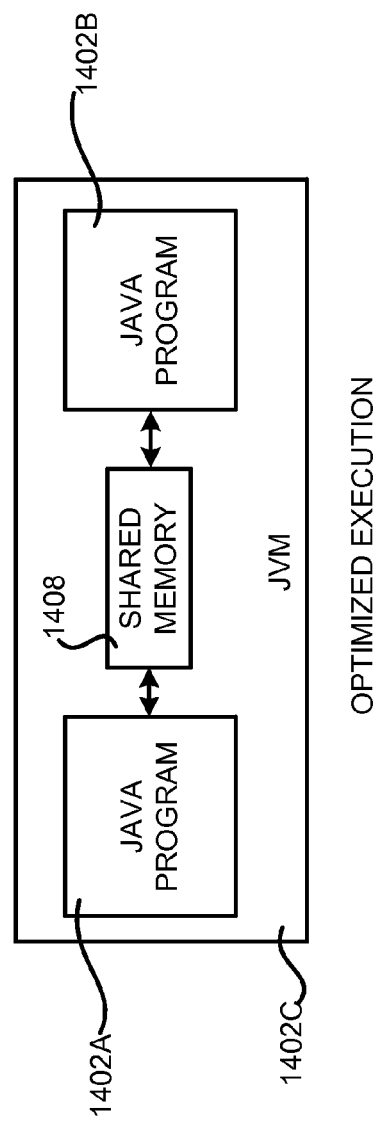

When the optimization component 112 encounters a configuration as shown in FIG. 14A, the optimization component 112 might cause the JAVA programs 1402A and 1402B to be containerized for execution within the same JVM. Additionally, the optimization component 112 might bind the JAVA programs 1102A and 1102B for communication by way of a shared memory 1408 rather than an IP network.

Other mechanisms might also be utilized to optimize communication between the JAVA programs 1402A and 1402B. In this regard, network calls from one JAVA program 1402A to the other JAVA program 1402B may be transparently resolved to local calls or to the shared memory 1408. Local call optimization can include simple IP optimization, local redirect, and shared memory-optimized calls that do not require serialization and de-serialization. These types of optimizations can greatly reduce latency. It should be appreciated that the concepts illustrated in FIGS. 14A and 14B might also be applied to other types of program components, such as but not limited to JAVASCRIPT programs executing in a containerized JAVASCRIPT execution environment.

Figure 15A:
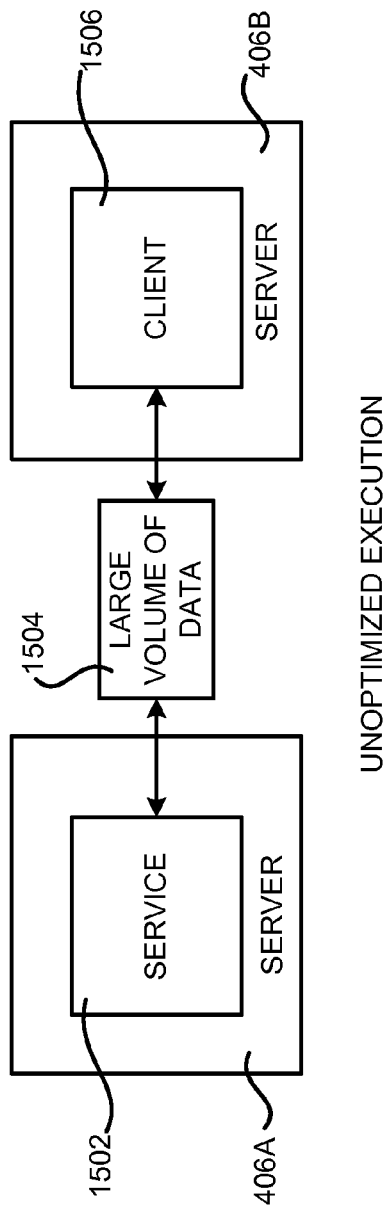
Figure 15B:
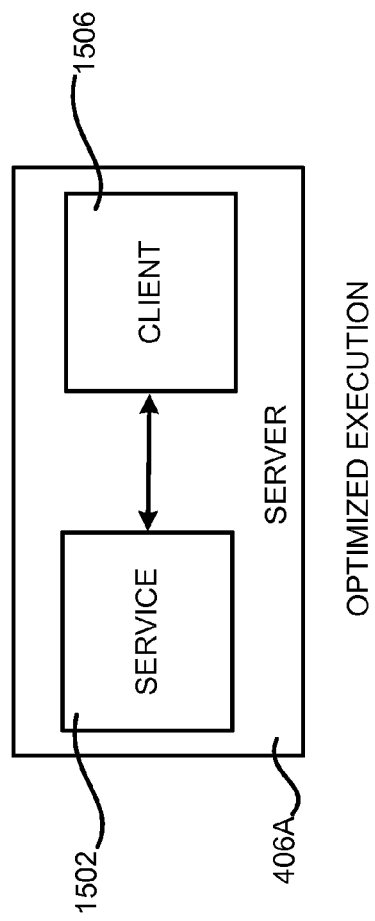

FIGS. 15A and 15B illustrate the optimization of a client 1506 and a service 1502 that execute as a part of a distributed program 104. In this example, the client 1506 and service 1502 are executing on different servers 406A and 406B and exchange a significant volume of data 1504, potentially over a LAN or WAN. In order to optimize the execution of these components, the optimization component 112 might cause the client 1506 and the service 1502 to be co-located on the same server 406A for execution. Communication between the service 1502 and client 1506 might also be optimized in the manner described above, such as through IP redirection, through a shared memory, or in another manner.

Figure 16A:
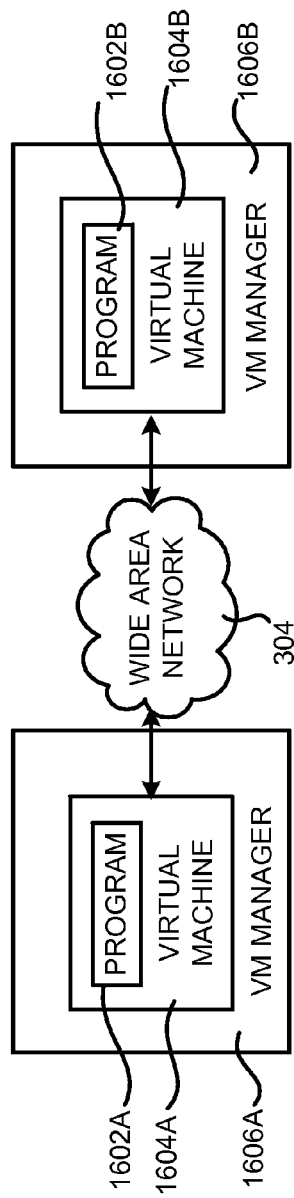

FIG. 16A illustrates two program components 1602A and 1602B executing in different virtual machines 1604A and 1604B, respectively, by different virtual machine managers 1606A and 1606B, respectively. The program components 1602A and 1602B communicate via a WAN 304.

Figure 16B:
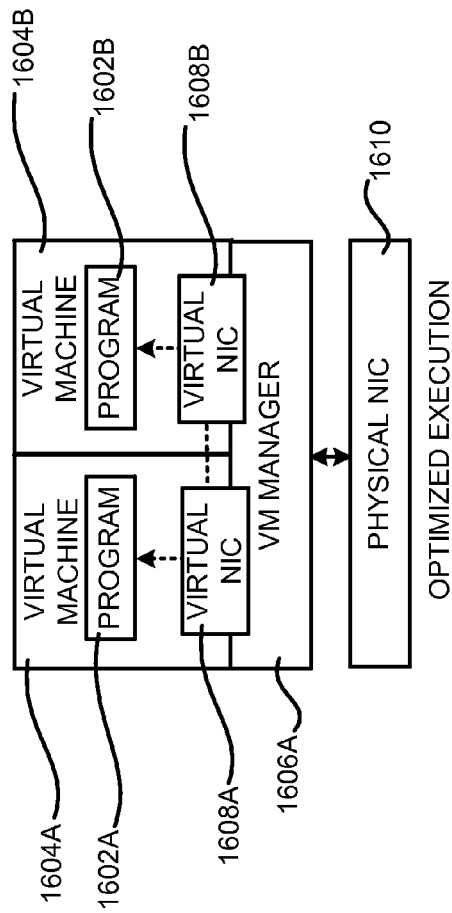

FIG. 16B shows one mechanism that might be utilized by the optimization component 112 to optimize the execution of the program components 1602A and 1602B. In this example, the VMM 1606A has been customized to optimize communication between programs executing in two different virtual machines 1604A and 1604B executing on the same physical computer. In this regard, the VMM 1606A is configured to expose a virtual network interface card ("NIC") 1608A to the virtual machine 1604A and another virtual NIC 1608B to the virtual machine 1604B. The VMM 1606A manages communication between the virtual NICs 1608A and 1608B and a physical NIC 1610.

In order to optimize communication between the program components 1602A and 1602B at the network layer, the VMM 1606A can determine that the destination IP address for traffic originating from one of the virtual machines 1604A and 1604B is another virtual machine managed by the VMM 1606A. In this case, the VMM 1606A can route the network traffic directly between the virtual NICs 1608A and 1608B assigned to each of the virtual machines 1604A and 1604B. In this way, the VMM 1606A can optimize communication between the programs 1602A and 1602B executing in the virtual machines 1604A and 1604B by not sending traffic over the network 304. This may reduce latency and also decreases transmission time.

Figure 16C:
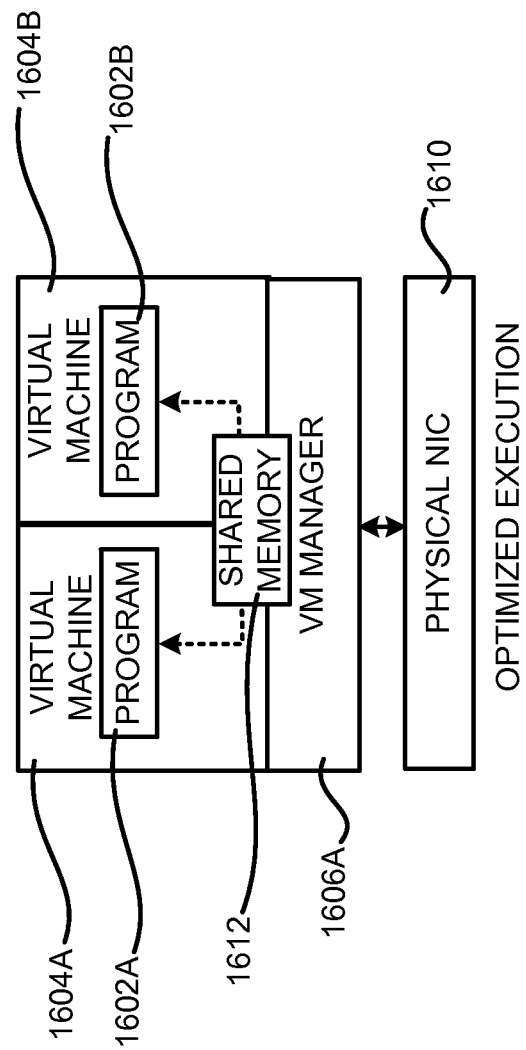
Figure 17A:
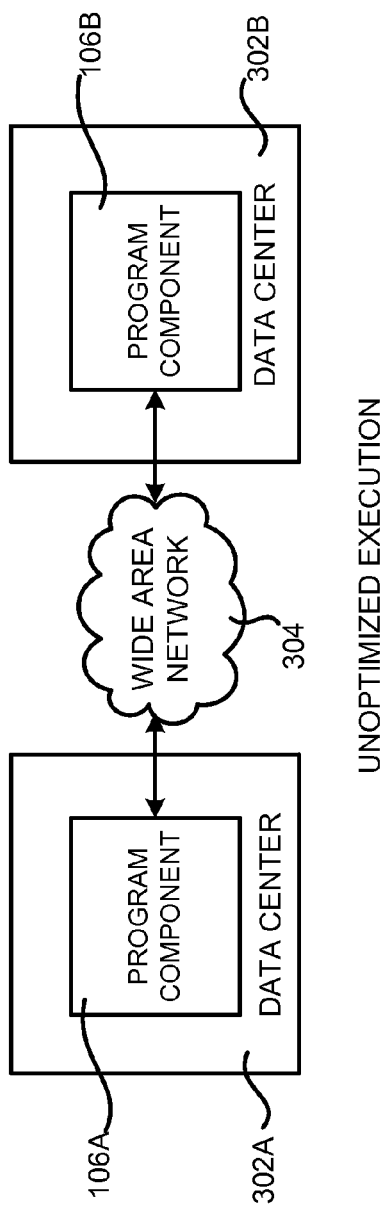
Figure 17B:
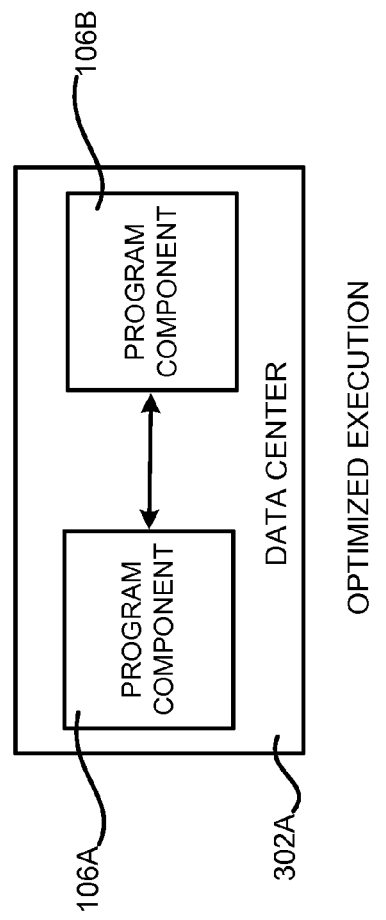

In another implementation illustrated in FIG. 16C, a shared memory 1612 is utilized by both of the programs 1602A and 1602B in order to share messages and other data. In this example, the programs 1602A and 1602B are configured for communicating with each other across a network 304, but are actually communicating through the shared memory 1612. This communication is managed by the VMM 1606A.

In the example shown in FIG. 16B, when communication is between the two virtual machines 1602A and 1602B, the shared memory 1612 controlled by the VMM 1606A is utilized rather than traversing the entire IP stack. The program components 1602A and 1602B executing on each virtual machine 1604A and 1604B place messages into and retrieve messages from the shared memory 1612. Mechanisms such as these can be used to optimize communications when two programs are executing on the same physical computer but in different virtual machines. Other mechanisms might also be utilized to optimize the communication between two programs executing in different virtual machines managed by the same VMM 1606A. In this way optimizations may be implemented in the VMM 1606A to eliminate communication over a network, such as the WAN 103.

In a similar fashion, communication between program components 106A and 106B that execute in different data centers 302A and 302B, respectively, might also be optimized. In this scenario, the optimization component 112 might cause the program components 106A and 106B to be deployed and executed within the same data center 302A, rather than in different data centers. In this way, network traffic over a WAN 304 may be reduced or even eliminated. In a similar fashion, the optimization component 112 might cause program components 106 that communicated with one another to be deployed to the same rack of server computers, to server computers connected to the same subnet, or deployed in other ways likely to reduce LAN or WAN traffic between the components. Other types of optimizations might also be performed.

It should be appreciated that the various optimizations described above are merely illustrative. In other implementations, the optimization component 112 might cause other types of optimizations to be implemented based upon the metrics, constraints and preferences set forth in the runtime optimization policy 110 and the description of the distributed program 104 set forth in the meta-description 108.

Figure 18:
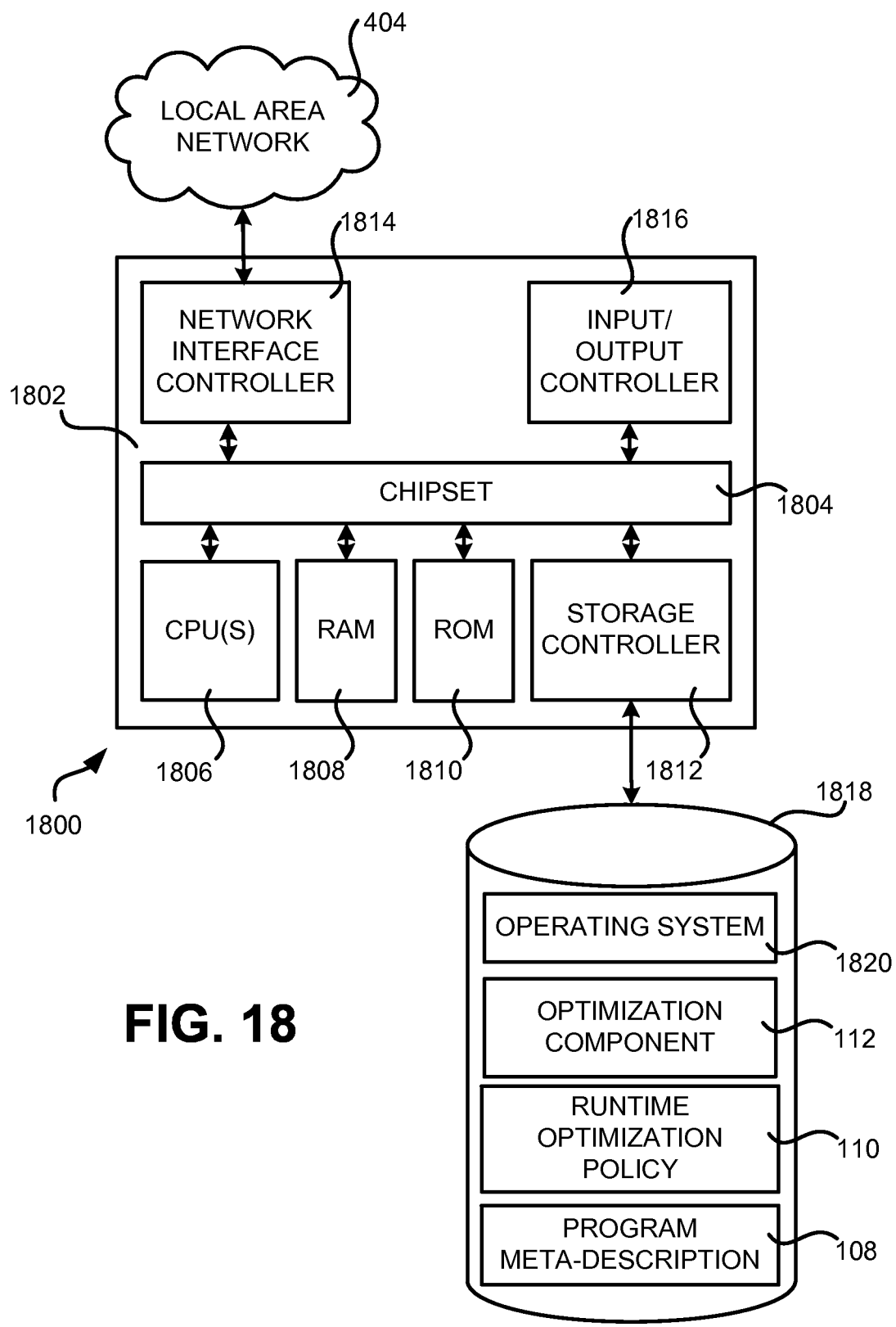
FIG. 18 is a computer architecture diagram showing one illustrative computer hardware architecture for implementing a computing device that might be utilized to implement aspects of the various embodiments presented herein.

FIG. 18 shows an example computer architecture for a computer 1800 capable of executing the programs described above. The computer architecture shown in FIG. 18 illustrates a conventional server computer, workstation, desktop computer, laptop, tablet, network appliance, PDA, e-reader, digital cellular phone, or other computing device, and may be utilized to execute any aspects of the software components presented herein described as executing within the data centers 302A-302N, on the server computers 2402A-402N, or on any other computing system mentioned herein.

The computer 1800 includes a baseboard, or "motherboard," which is a printed circuit board to which a multitude of components or devices may be connected by way of a system bus or other electrical communication paths. In one illustrative embodiment, one or more central processing units ("CPUs") 1806 operate in conjunction with a chipset 1804. The CPUs 1806 may be standard programmable processors that perform arithmetic and logical operations necessary for the operation of the computer 1800.

The CPUs 1806 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1804 provides an interface between the CPUs 1806 and the remainder of the components and devices on the baseboard. The chipset 1804 may provide an interface to a random access memory ("RAM") 1808, used as the main memory in the computer 1800. The chipset 1804 may further provide an interface to a computer-readable storage medium such as a read-only memory ("ROM") 1810 or non-volatile RAM ("NVRAM") for storing basic routines that help to startup the computer 1800 and to transfer information between the various components and devices. The ROM 1810 or NVRAM may also store other software components necessary for the operation of the computer 1800 in accordance with the embodiments described herein.

The computer 1800 may operate in a networked environment using logical connections to remote computing devices and computer systems through a network, such as the local area network 404. The chipset 1804 may include functionality for providing network connectivity through a NIC 1814, such as a gigabit Ethernet adapter. The NIC 1814 is capable of connecting the computer 1800 to other computing devices over the network 404. It should be appreciated that multiple NICs 1814 may be present in the computer 1800, connecting the computer to other types of networks and remote computer systems.

The computer 1800 may be connected to a mass storage device 1818 that provides non-volatile storage for the computer. The mass storage device 1818 may store system programs, application programs, other program modules, and data, which have been described in greater detail herein. The mass storage device 1818 may be connected to the computer 1800 through a storage controller 1812 connected to the chipset 1804. The mass storage device 1818 may consist of one or more physical storage units. The storage controller 1812 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1800 may store data on the mass storage device 1818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1818 is characterized as primary or secondary storage, and the like.

For example, the computer 1800 may store information to the mass storage device 1818 by issuing instructions through the storage controller 1812 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1800 may further read information from the mass storage device 1818 by detecting the physical states or characteristics of one or more particular locations within the physical storage units.

In addition to the mass storage device 1818 described above, the computer 1800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1818 may store an operating system 1820 utilized to control the operation of the computer 1800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1818 may store other system or application programs and data utilized by the computer 1800, such as the optimization component 112, the runtime optimization policy 110, the program meta-description 108, and/or the other software components and data described above.

In one embodiment, the mass storage device 1818 or other computer-readable storage media is encoded with computer-executable instructions which, when loaded into the computer 1800, transforms the computer from a general-purpose computing system into a special-purpose computer capable of implementing the embodiments described herein. These computer-executable instructions transform the computer 1800 by specifying how the CPUs 1806 transition between states, as described above. According to one embodiment, the computer 1800 has access to computer-readable storage media storing computer-executable instructions which, when executed by the computer 1800, perform the routines 1000, 1100, 1200 and 1300, described with regard to FIGS. 10, 11, 12 and 13, respectively.

The computer 1800 may also include an input/output controller 1816 for receiving and processing input from a number of input devices, such as a keyboard, a mouse, a touchpad, a touch screen, an electronic stylus, or other type of input device. Similarly, the input/output controller 1816 may provide output to a display, such as a computer monitor, a flat-panel display, a digital projector, a printer, a plotter, or other type of output device. It will be appreciated that the computer 1800 may not include all of the components shown in FIG. 18, may include other components that are not explicitly shown in FIG. 18, or may utilize an architecture completely different than that shown in FIG. 18.

Based on the foregoing, it should be appreciated that technologies for optimized deployment and execution of a program in a distributed computing environment have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for optimizing a distributed program, the method comprising performing computer-implemented operations for:

receiving a meta-description for a distributed program, the distributed program comprising program components configured for execution in a distributed computing environment, wherein the meta-description for the distributed program comprises, for at least a first program component of the program components of the distributed program, (i) data defining one or more consumable interfaces exposed by the at least the first program component that are selectively called by a second one or more program components and (ii) one or more dependency adapters utilized by the at least the first program component, wherein the one or more dependency adapters comprise interfaces that are selectively called by the at least the first program component;

receiving a runtime optimization policy for the distributed program, the runtime optimization policy comprising at least one optimization metric and at least one optimization constraint, wherein the optimization metric is comprised of at least one of latency, speed of execution, reliability, guaranteed execution, availability, cost, scalability, memory usage, disk usage, or accuracy of the distributed program; and optimizing a deployment and an execution of one or more of the program components of the distributed program, based at least in part on (i) the received runtime optimization policy and (ii) the meta-description comprising data defining the one or more consumable interfaces and the one or more dependency adapters.

2. The computer-implemented method of claim 1, wherein the optimization of the deployment and execution of the one or more program components of the distributed program occurs at least at a build time of the program components of the distributed program.

3. The computer-implemented method of claim 1, wherein the optimization of the deployment and execution of the one or more program components of the distributed program occurs at least at a deployment time of the program components of the distributed program.

4. The computer-implemented method of claim 1, wherein the optimization of the deployment and execution of the one or more program components of the distributed program occurs at least at a runtime of the program components of the distributed program.

5. A system for optimizing the deployment and execution of a distributed program, the system comprising:
   a distributed computing environment configured to execute a distributed program, the distributed program comprising a plurality of program components;
   at least one computer configured to receive a meta-description for the distributed program, wherein the meta-description for the distributed program comprises, for at least one program component of the program components of the distributed program, (i) data defining one or more consumable interfaces exposed by the at least one program component that are selectively called by one or more other program components and (ii) one or more dependency adapters utilized by the at least one program component;
   at least one computer configured to receive a runtime optimization policy for the distributed program, the runtime optimization policy comprising at least one optimization metric and at least one optimization constraint, wherein the optimization metric is comprised of at least one of latency, speed of execution, reliability, guaranteed execution, availability, cost, scalability, memory usage, disk usage, or accuracy of the distributed program; and
   at least one computer configured to configure and deploy one or more of the program components of the distributed program to the distributed computing environment for optimized execution, based at least in part on (i) the received runtime optimization policy and (ii) the meta-description comprising data defining the one or more consumable interfaces and the one or more dependency adapters.

6. The system of claim 5, wherein the runtime optimization policy further specifies one or more preferences for the execution of the distributed program.

7. The system of claim 6, wherein the program components are executed at a runtime of the distributed program by executing the program components in accordance with the one or more preferences for the execution of the distributed program.

8. The system of claim 5, wherein the runtime optimization policy is user-specified.

9. The system of claim 5, wherein the optimization of the deployment and execution of the one or more program components of the distributed program occurs at least at a build time of the program components of the distributed program.

10. The system of claim 9, wherein optimizing the distributed program at a build time of the program components comprises containerizing one or more of the program components in an execution environment, based at least in part on (i) the received runtime optimization policy and (ii) the meta-description comprising data defining the one or more consumable interfaces and the one or more dependency adapters.

11. The system of claim 9, wherein optimizing the distributed program at a build time of the program components comprises binding one or more of the program components to one or more frameworks for optimized inter-component communication, based at least in part on (i) the received runtime optimization policy and (ii) the meta-description comprising data defining the one or more consumable interfaces and the one or more dependency adapters.

12. The system of claim 9, wherein optimizing the distributed program at a build time of the program components comprises configuring one or more of the program components for optimized inter-component communication, based at least in part on (i) the received runtime optimization policy and (ii) the meta-description comprising data defining the one or more consumable interfaces and the one or more dependency adapters.

13. The system of claim 9, wherein optimizing the distributed program at a build time of the program components comprises optimizing the distributed program at two or more levels of a stack associated with the distributed program.

14. The system of claim 5, wherein the optimization of the deployment and execution of the one or more program components of the distributed program occurs at least at a deployment time of the program components of the distributed program.

15. The system of claim 14, wherein optimizing the distributed program at a deployment time comprises:
   selecting a location in the distributed computing environment for optimized execution of the program components, based at least in part on (i) the received runtime optimization policy and (ii) the meta-description comprising data defining the one or more consumable interfaces and the one or more dependency adapters; and
   deploying the program components to the selected locations in the distributed computing environment.

16. The system of claim 14, wherein one or more of the program components of the distributed program have been containerized, and wherein optimizing the distributed program at a deployment time comprises:
   selecting a location in the distributed computing environment for optimized execution of each of the containerized program components, based at least in part on (i) the received runtime optimization policy and (ii) the meta-description comprising data defining the one or more consumable interfaces and the one or more dependency adapters; and
   deploying the containerized program components to the selected location in the distributed computing environment.

17. The system of claim 5, wherein the optimization of the deployment and execution of the one or more program components of the distributed program occurs at least at a runtime of the program components of the distributed program.

18. A non-transitory computer-readable storage medium having computer-executable instructions stored thereupon which, when executed by a computer, cause the computer to:
   receive a meta-description for a distributed program, the distributed program comprising program components configured for execution in a distributed computing environment, wherein the meta-description for the distributed program comprises, for individual ones of the program components of the distributed program, (i)

data defining one or more consumable interfaces exposed by the program components that are selectively called by one or more other program components and (ii) one or more dependency adapters utilized by the program components;

receive a runtime optimization policy for the distributed program, the runtime optimization policy comprising at least one optimization metric and at least one optimization constraint, wherein the optimization metric is comprised of at least one of latency, speed of execution, reliability, guaranteed execution, availability, cost, scalability, memory usage, disk usage, or accuracy of the distributed program; and configure and deploy the program components of the distributed program for optimized execution in the distributed computing environment, based at least in part on (i) the received one or more metrics included in the runtime optimization policy and (ii) the meta-description comprising data defining the one or more consumable interfaces and the one or more dependency adapters utilized by the program components.

19. The non-transitory computer-readable storage medium of claim 18, having further computer-executable instructions stored thereupon which, when executed by the computer, cause the computer to:

receive one or more preferences for the execution of the distributed program; and utilize the received preferences to configure and deploy the program components of the distributed program for optimized execution in the distributed computing environment.

20. The non-transitory computer-readable storage medium of claim 18, wherein the program components of the distributed program are optimized at least at a build time of the program components of the distributed program.

21. The non-transitory computer-readable storage medium of claim 20, wherein optimizing the distributed program at a build time of the program components comprises configuring one or more of the program components for optimized inter-component communication.

22. The non-transitory computer-readable storage medium of claim 18, wherein the program components of the distributed program are optimized at least at a deployment time of the program components of the distributed program.

23. The non-transitory computer-readable storage medium of claim 22, wherein optimizing the distributed program at a deployment time comprises:

selecting a location in the distributed computing environment for efficient execution of the program components; and causing the program components to be deployed to the selected locations in the distributed computing environment.

24. The non-transitory computer-readable storage medium of claim 18, wherein the program components of the distributed program are optimized at least at a runtime of the program components of the distributed program.

* * * * *